United States Patent
Sugiura et al.

(10) Patent No.: US 12,200,140 B2
(45) Date of Patent: Jan. 14, 2025

(54) DATA MANAGEMENT SYSTEM

(71) Applicant: SYSNA, Inc., Aichi (JP)

(72) Inventors: Shinichi Sugiura, Nagoya (JP); Nobuyuki Nakahara, Tokyo (JP); Mika Asano, Nagoya (JP)

(73) Assignee: SYSNA, Inc., Aichi (JP)

( * ) Notice: Subject to any disclaimer, the term of this patent is extended or adjusted under 35 U.S.C. 154(b) by 405 days.

(21) Appl. No.: 17/904,175

(22) PCT Filed: Feb. 10, 2021

(86) PCT No.: PCT/JP2021/004894
§ 371 (c)(1),
(2) Date: Aug. 12, 2022

(87) PCT Pub. No.: WO2021/162025
PCT Pub. Date: Aug. 19, 2021

(65) Prior Publication Data
US 2023/0052572 A1 Feb. 16, 2023

(30) Foreign Application Priority Data

Feb. 14, 2020 (JP) ................................. 2020-022974

(51) Int. Cl.
*G06F 21/62* (2013.01)
*G06F 21/64* (2013.01)
*H04L 9/32* (2006.01)

(52) U.S. Cl.
CPC ............ *H04L 9/3242* (2013.01); *G06F 21/62* (2013.01); *G06F 21/64* (2013.01)

(58) Field of Classification Search
CPC ......... H04L 9/3242; G06F 21/62; G06F 21/64
See application file for complete search history.

(56) References Cited

U.S. PATENT DOCUMENTS

| 10,348,505 B1* | 7/2019 | Crawforth ............. H04L 9/3236 |
| 2012/0204024 A1* | 8/2012 | Augenstein ......... G06F 11/1453 |
| | | 713/150 |
| 2020/0267127 A1* | 8/2020 | Mitra ...................... H04L 9/088 |

FOREIGN PATENT DOCUMENTS

| JP | 2019-106639 A | 6/2019 | |
| JP | 6683332 B1 | 4/2020 | |
| WO | WO-2016107458 A1 * | 7/2016 | ............... H04L 9/32 |

OTHER PUBLICATIONS

Zhang PCT Publication WO 2016107458 (machine translation)) (Year: 2016).*

(Continued)

*Primary Examiner* — Kaveh Abrishamkar
*Assistant Examiner* — Howard H. Louie
(74) *Attorney, Agent, or Firm* — Studebaker & Brackett PC

(57) ABSTRACT

In a blockchain, contents of communication of electronic data are basically made public, and a malicious person can find system vulnerability of the blockchain. Leak of secret information or the like to an unintended third party through unauthorized access or the like by exploiting the vulnerability and cause is actually possible. Thus, it cannot be said that sufficient security measures are taken. In the present invention, a colony server stores partial data containing data of a predetermined size from a beginning of data to be managed received from a terminal, and a center server stores body data containing data of the predetermined size +1 and thereafter. Thus, the data to be managed is managed in a divided manner. Also, even if the body data is leaked from the colony server through unauthorized access or the like, the body data is merely part of the data to be managed, and has no value on its own. Thus, the present invention provides a system and the like for achieving robust security against unauthorized access.

20 Claims, 23 Drawing Sheets

(56) References Cited

OTHER PUBLICATIONS

Written Opinion issued in PCT/JP2021/004894; mailed Apr. 27, 2021.
International Search Report issued in PCT/JP2021/004894; mailed Apr. 27, 2021.

* cited by examiner

FIG.9
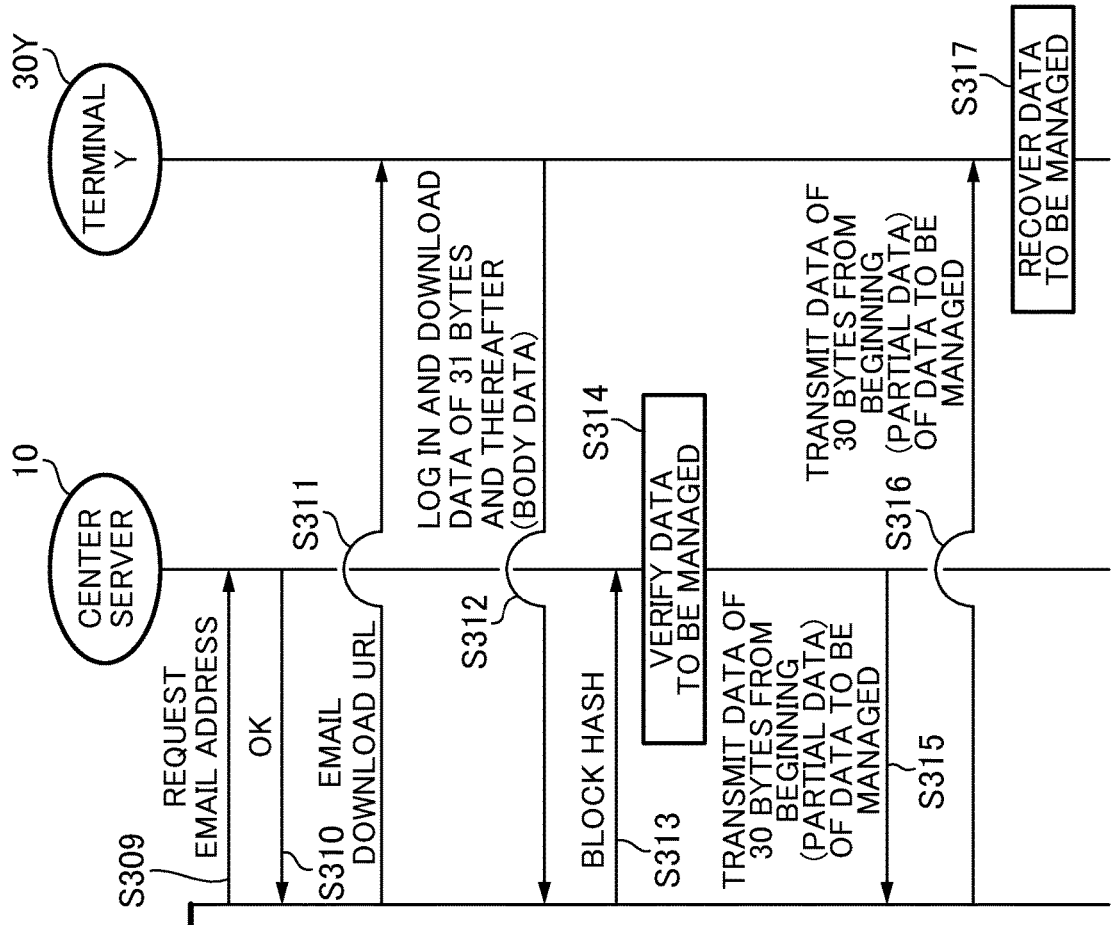
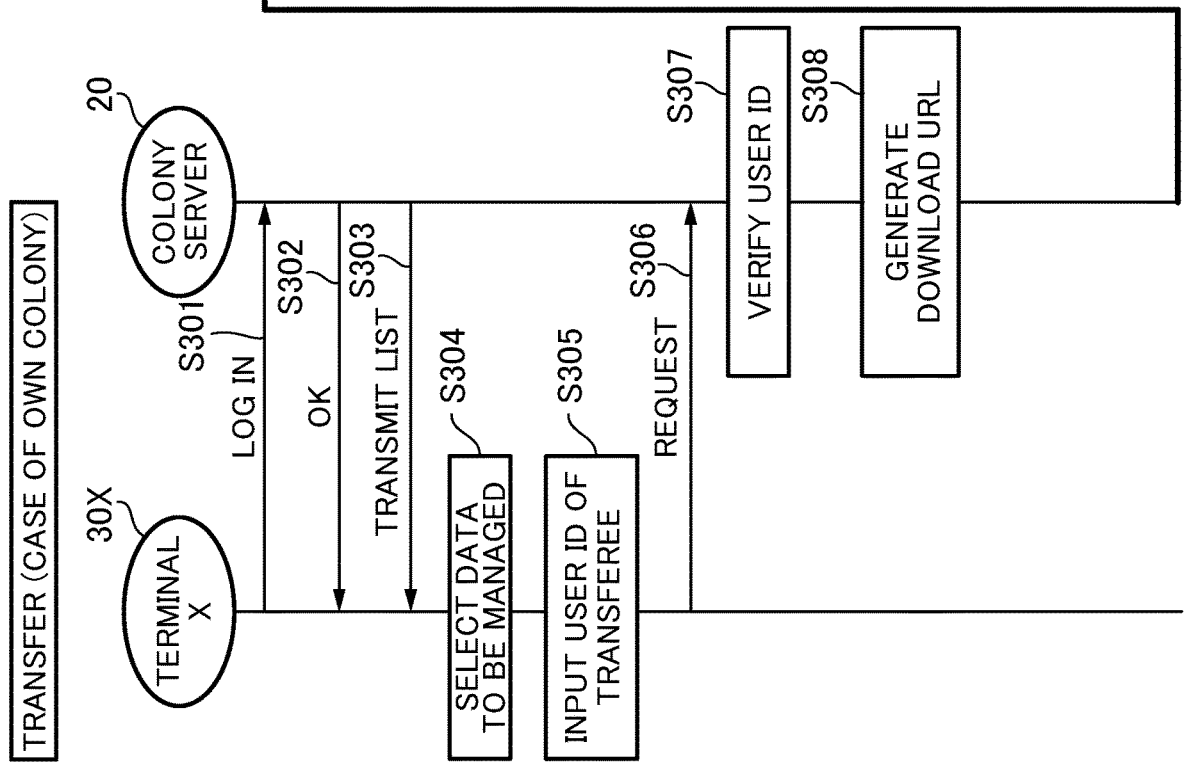

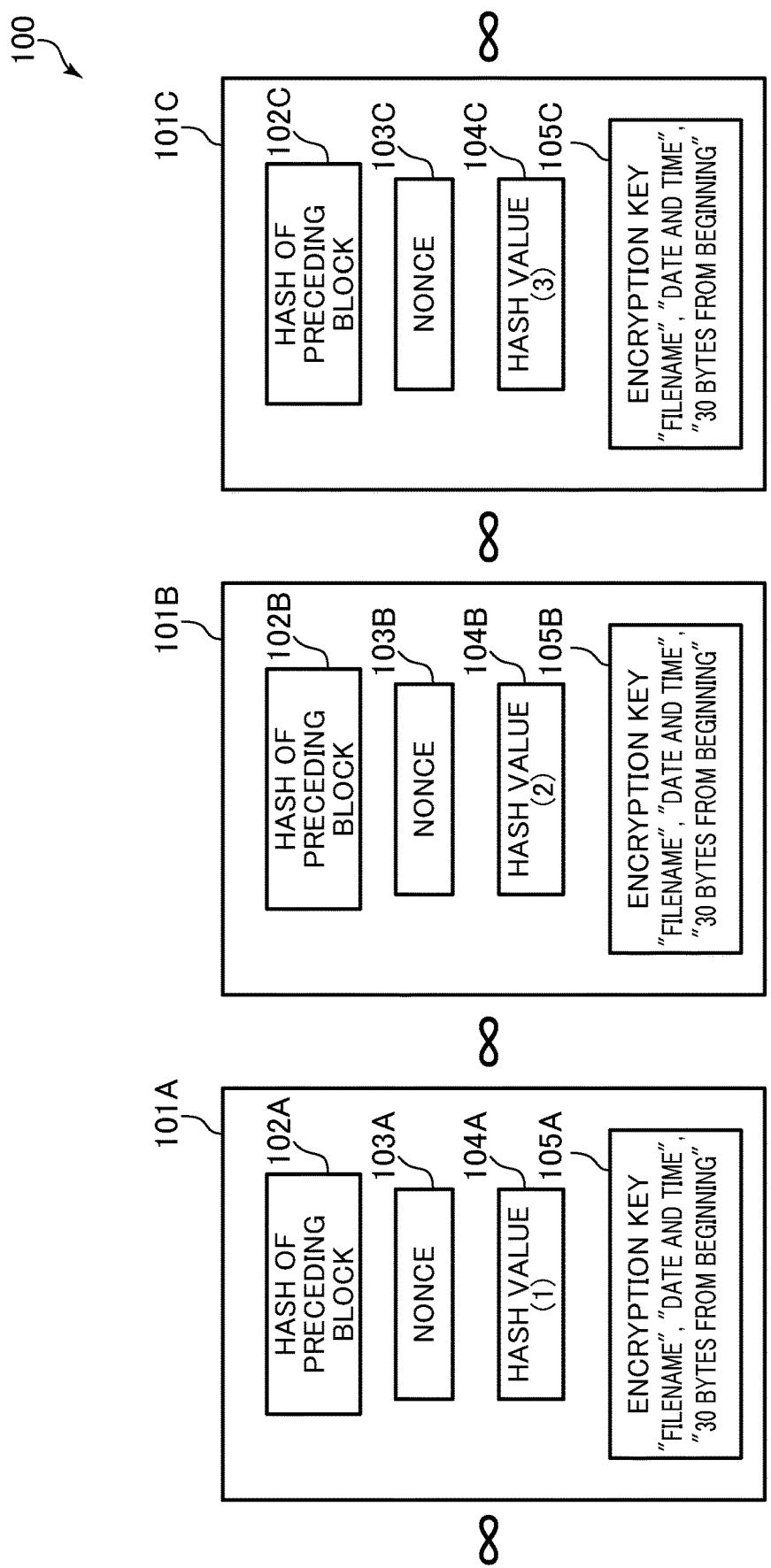

CENTER SERVER (DATA INDEPENDENT OF DATA RELATED TO BLOCKCHAIN)

| COLONY SERVER ID | USER ID | VALID FLAG (TRUE/FALSE) |
|---|---|---|
| AAAAAAAAAAAAA | xxxxxxxxxxxxxxxx | TRUE |
| BBBBBBBBBBBBB | yyyyyyyyyyyyyy | TRUE |
| CCCCCCCCCCCCC | zzzzzzzzzzzzzzzz | FALSE |

(b)

| USER ID | EMAIL ADDRESS | VALID FLAG (TRUE/FALSE) |
|---|---|---|
| xxxxxxxxxxxxxxxx | xxx@abc.co.jp | TRUE |
| yyyyyyyyyyyyyy | yyy@abc.net | TRUE |
| zzzzzzzzzzzzzzzz | zzz@ccc.ac.jp | FALSE |

FIG.20

COLONY SERVER

| USER ID | OWNED BLOCK HASH (64 BYTES) | TRANSACTION DATE AND TIME (YYYY/MM/DD HH:MM:SS) | VALID FLAG (TRUE/FALSE) |
|---|---|---|---|
| XXXXXXXXXXXXXX | HASH VALUE(1) | 20190511001125 | TRUE |
| YYYYYYYYYYYYYY | HASH VALUE(2) | 20190406002255 | TRUE |
| ZZZZZZZZZZZZZZ | HASH VALUE(3) | 20180115051645 | FALSE |

DATA MANAGEMENT SYSTEM

TECHNICAL FIELD

The present invention relates to a system, a method, a device, and a program for safely storing data such as secret information, electronic exchange, additional telegraphic messages, cryptocurrency, virtual currency, electronic currency, or valuable securities (hereinafter referred to as data to be managed) through a network such as the Internet in a plurality of servers forming a cloud, and allowing an information processing terminal used by a user to obtain the data to be managed as appropriate in response to a request from the terminal.

Specifically, the present invention relates to a technology such that a server (hereinafter referred to as "colony server") connected to a user's information processing terminal such as a smartphone or a computer through a network such as the Internet divides data to be managed uploaded from the user's information processing terminal into partial data containing data of a predetermined size from a beginning and body data containing subsequent data, and transmits the partial data to a server (hereinafter referred to as "center server") connected through a closed network to the colony server, the center server encrypts the received partial data and stores the partial data as one block of a blockchain, updates a hash value of the partial data at predetermined intervals, and updates a hash value of the body data to the same value as that of the partial data, thereby achieving high security and allowing safe circulation of data to be managed.

BACKGROUND ART

Conventionally, for example, transactions of financial instruments or the like have been conducted through reliable centralized institutions such as financial institutions or governments, but, in recent years, a distributed ledger technology using a blockchain on peer-to-peer (P2P) between users has been available in place of direct transactions.

The distributed ledger technology allows transactions between parties to a distributed ledger system to be settled by consensus building or approval by (any or particular) parties rather than centralized institutions. The distributed ledger technology can also substantially preclude tampering by combining a plurality of transactions as blocks, recording the blocks like beads in a distributed ledger called a blockchain, and performing hash calculation of the continuous blocks. Further, the distributed ledger technology allows transactions to be checked by all parties by the same ledger data being shared by all the parties.

From the above features, the distributed ledger technology such as a blockchain has been considered to be applied in a variety of fields including financial sectors and Internet of Things (IoT) as a reliable system for managing and sharing data or for conducting and managing a transaction under a contract. As one application, a transaction of cryptocurrency such as Bitcoin has implemented the distributed ledger technology such as a blockchain. Cryptocurrency is also referred to as virtual currency.

In electronic commerce in which a user uses an information processing terminal such as a smartphone to buy and sell cryptocurrency (such as virtual currency, various financial instruments) on-line through a network, transaction records can be recorded on a blockchain. For example, Japanese Patent Laid-Open No. 2019-106639 (Patent Literature 1) discloses an electronic commerce device and the like that allows the electronic commerce as described above to be conducted on a blockchain. On the blockchain, absconding of contents or the like can be prevented due to difficulty in tampering of transaction records or the like even without trust between parties or trust in a third party.

CITATION LIST

Patent Literature
Patent Literature 1: Japanese Patent Laid-Open No. 2019-106639

SUMMARY OF INVENTION

Technical Problem

As described above, the electronic commerce of cryptocurrency can be achieved using a blockchain, however, in the blockchain, fairness of a transaction is guaranteed by nodes constituting the blockchain, and contents of the transaction are basically made public. Thus, a malicious person can search for system vulnerability of the blockchain. If finding vulnerability, the person is likely to exploit the vulnerability and cause leak of cryptocurrency to an unintended third party through unauthorized access or the like. Thus, it cannot be said that sufficient security measures for the blockchain are taken.

Also, guaranteeing fairness of a transaction recorded on a blockchain requires verifying, using a computer, that each of a plurality of blocks in the blockchain is a correct record. For example, a Proof of Work (POW) system used by Bitcoin requires an enormous amount of calculation using a computer to change a value called nonce in a brute-force manner to calculate a hash value (for example, a hash value beginning from a certain number of consecutive zeros) that satisfies a predetermined condition in order to add a new block to the blockchain, and the calculation consumes a large amount of power.

To solve these problems, the present invention provides a data management system including at least a terminal, a colony server, and a center server to safely store data to be managed such as secret information, electronic exchange, additional telegraphic messages, cryptocurrency, virtual currency, electronic currency, or valuable securities on a cloud and distribute the data on-line to users as appropriate. In the data management system according to the present invention, the colony server stores partial data containing data of a predetermined size from a beginning of data to be managed received from the terminal, and the center server stores body data containing data of the predetermined size +1 and thereafter. Thus, the data to be managed is managed in a divided manner into the partial data and the body data. Also, even if the body data is leaked from the colony server through unauthorized access or the like, the body data is merely part of the data to be managed, and has no value on its own, and the data to be managed cannot be recovered only from the body data. As such, the present invention provides a data management system, method, device, and program (hereinafter also simply referred to as "data management system and the like") that achieve robust security against substantial damage even if the body data is unauthorizedly leaked from the colony server.

Also, in the present invention, the center server encrypts the received partial data and stores the partial data as one block of a blockchain, updates a hash value of the partial data at predetermined intervals, and updates a hash value of the body data in the colony server to the same value as that of the partial data. Then, even if the body data is leaked from the colony server through unauthorized access or the like, and an attempt is made to identify an encryption key containing the partial data paired with the body data, the hash value of the encryption key is updated at predetermined intervals, and thus an encryption key containing a hash value matching the hash value contained in the unauthorizedly leaked body data no longer exists. Thus, the present invention provides a data management system and the like that precludes recovery of the data to be managed from the unauthorizedly leaked body data.

Further, in the present invention, the center server can store only the partial data as part of the data to be managed rather than the entire data to be managed in the blockchain, and thus can manage the blockchain within a relatively small storage area. The present invention provides a data management system and the like that can simplify or omit calculation for guaranteeing fairness of the blockchain by the center server being operated in reliable institutions such as governments or banks.

Solution to Problem

As an embodiment of a data management system according to the present invention, the data management system includes at least: a terminal; a colony server connected through a first network to the terminal; and a center server connected through a second network to the colony server, the terminal transmits a request related to data to be managed to the colony server, the colony server includes a division transmission unit configured to divide data to be managed obtained or generated in response to the request related to the data to be managed into partial data containing data of a predetermined size from a beginning, and body data containing data of the predetermined size +1 and thereafter, and transmit the partial data to the center server, a body data management unit configured to receive a hash value from the center server, and store the hash value associated with the body data, and a hash update unit configured to update the hash value, the center server includes a partial data management unit configured to generate an encryption key as encrypted data containing at least the partial data, and store, together with the encryption key, the hash value for identifying the encryption key, a hash notification unit configured to transmit the hash value stored together with the encryption key to the colony server, and an encryption key obtaining unit configured to identify the encryption key using the hash value and obtain the encryption key, the hash notification unit updates the hash value stored together with the encryption key to a new hash value that does not match the hash value stored associated with the body data at predetermined intervals, and transmits the new hash value to the colony server, the hash update unit receives the new hash value, and updates the hash value stored associated with the body data to the new hash value, when the hash value stored together with the encryption key is updated, the encryption key obtaining unit identifies the encryption key using the new hash value and obtains the encryption key in response to a request related to data to be managed containing the new hash value from the colony server, the partial data is recovered from the encryption key, and the data to be managed is recovered by coupling the partial data and the body data.

As a preferred embodiment of the data management system according to the present invention, the partial data management unit encrypts the partial data together with at least one of a filename and time of the data to be managed, and the encryption key contains the partial data and at least one of the filename and the time.

As a preferred embodiment of the data management system according to the present invention, the request related to the data to be managed contains data to be managed corresponding to an object to be managed uploaded from the terminal.

As a preferred embodiment of the data management system according to the present invention, the request related to the data to be managed is a request to cause the colony server to generate data to be managed corresponding to the object to be managed.

As a preferred embodiment of the data management system according to the present invention, the predetermined size is 30 bytes or less from the beginning of the data to be managed.

As a preferred embodiment of the data management system according to the present invention, the predetermined interval is 24 hours or shorter.

As a preferred embodiment of the data management system according to the present invention, the first network is the Internet and the second network is a closed network.

As a preferred embodiment of the data management system according to the present invention, the division transmission unit of the colony server divides the data to be managed into partial data containing data of a predetermined size from any one part of the data to be managed in place of the data of the predetermined size from the beginning, and body data containing data of a remaining part other than the any one part of the data to be managed in place of the data of the predetermined size +1 and thereafter.

As an embodiment of a data management method according to the present invention, the data management method is performed by a data management system including at least a terminal, a colony server connected through a first network to the terminal, and a center server connected through a second network to the colony server, and includes the steps of: the terminal transmitting a request related to data to be managed to the colony server; the colony server dividing data to be managed obtained or generated in response to the request related to the data to be managed into partial data containing data of a predetermined size from a beginning, and body data containing data of the predetermined size +1 and thereafter, and transmitting the partial data to the center server; the center server generating an encryption key as encrypted data containing at least the partial data; the center server storing, together with the encryption key, a hash value for identifying the encryption key; the center server transmitting the hash value to the colony server; and the colony server storing the hash value associated with the body data, the center server updates the hash value stored together with the encryption key to a new hash value that does not match the hash value stored associated with the body data at predetermined intervals, and transmits the new hash value to the colony server, the colony server updates the hash value stored associated with the body data to the new hash value, when the hash value stored together with the encryption key is updated, the center server identifies the encryption key using the new hash value and obtains the encryption key in response to a request related to data to be managed containing the new hash value from the colony server, the partial data is recovered from the encryption key, and the data to be managed is recovered by coupling the partial data and the body data.

As a preferred embodiment of the data management method according to the present invention, in the step of generating the encryption key, the center server encrypts the partial data together with at least one of a filename and time of the data to be managed, and the encryption key contains the partial data and at least one of the filename and the time.

As a preferred embodiment of the data management method according to the present invention, the request related to the data to be managed contains data to be managed corresponding to an object to be managed uploaded from the terminal.

As a preferred embodiment of the data management method according to the present invention, the request related to the data to be managed is a request to cause the colony server to generate data to be managed corresponding to the object to be managed.

As a preferred embodiment of the data management method according to the present invention, the predetermined size is 30 bytes or less from the beginning of the data to be managed.

As a preferred embodiment of the data management method according to the present invention, the predetermined interval is 24 hours or shorter.

As a preferred embodiment of the data management method according to the present invention, the first network is the Internet and the second network is a closed network.

As a preferred embodiment of the data management method according to the present invention, the step of the colony server dividing data to be managed obtained or generated in response to the request related to the data to be managed into partial data containing data of a predetermined size from a beginning, and body data containing data of the predetermined size +1 and thereafter, and transmitting the partial data to the center server includes dividing the data to be managed into partial data containing data of a predetermined size from any one part of the data to be managed in place of the data of the predetermined size from the beginning, and body data containing data of a remaining part other than the any one part of the data to be managed in place of the data of the predetermined size +1 and thereafter.

As an embodiment of a colony server device according to the present invention, the colony server device includes: means for receiving, from a terminal, a request related to data to be managed; division transmission means for dividing data to be managed obtained or generated in response to the request related to the data to be managed into partial data containing data of a predetermined size from a beginning, and body data containing data of the predetermined size +1 and thereafter, and transmitting the partial data to a center server device; and body data management means for receiving, from the center server device, a hash value for identifying an encryption key as encrypted data containing at least the partial data, and storing the hash value associated with the body data, the colony server device receives, from the center server device, a new hash value that does not match the hash value stored associated with the body data at predetermined intervals, the colony server device updates the hash value stored associated with the body data to the new hash value at predetermined intervals, when the hash value stored together with the encryption key is updated, the colony server device transmits, to the center server device, a request related to data to be managed containing the new hash value to cause the center server device to identify the encryption key using the new hash value, the partial data is recovered from the encryption key, and the data to be managed is recovered by coupling the partial data and the body data.

As a preferred embodiment of the colony server device according to the present invention, the division transmission means divides the data to be managed into partial data containing data of a predetermined size from any one part of the data to be managed in place of the data of the predetermined size from the beginning, and body data containing data of a remaining part other than the any one part of the data to be managed in place of the data of the predetermined size +1 and thereafter.

As an embodiment of a center server device according to the present invention, the center server device includes: means for receiving, from a colony server device, partial data containing data of a predetermined size from a beginning of data to be managed; partial data management means for generating an encryption key as encrypted data containing at least the partial data, and storing, together with the encryption key, a hash value for identifying the encryption key; and hash notification means for transmitting the hash value stored together with the encryption key to the colony server device, the hash notification means updates the hash value stored together with the encryption key to a new hash value that does not match the hash value at predetermined intervals, and transmits the new hash value to the colony server device, when the hash value stored together with the encryption key is updated, the center server device identifies the encryption key using the new hash value in response to a request related to data to be managed containing the new hash value from the colony server device, the partial data is recovered from the encryption key, and the data to be managed is recovered by coupling the partial data and body data containing data of the predetermined size from the beginning of the data to be managed +1 and thereafter.

As a preferred embodiment of the center server device according to the present invention, the partial data contains data of a predetermined size from any one part of the data to be managed in place of the data of the predetermined size from the beginning, and the body data contains data of a remaining part other than the any one part of the data to be managed in place of the data of the predetermined size +1 and thereafter.

As an embodiment of a program according to the present invention, the program is performed by a computer to cause the computer to function as means of the colony server device.

As an embodiment of a program according to the present invention, the program is performed by a computer to cause the computer to function as means of the center server device.

Advantageous Effects of Invention

With the data management system, method, device, and program according to the present invention, the colony server stores the partial data containing the data of the predetermined size from the beginning of the data to be managed received from the terminal, and the center server stores the body data containing the data of the predetermined size +1 and thereafter. Thus, the data to be managed is managed in a divided manner. Also, even if the body data is leaked from the colony server through unauthorized access or the like, the body data is merely part of the data to be managed, and has no value on its own. This can achieve robust security against unauthorized access.

Also, with the data management system and the like according to the present invention, the hash value of the partial data stored as the encryption key in one block in the blockchain managed by the center server is updated at predetermined intervals, and the hash value of the body data in the colony server is updated to the same value as that of the partial data. Then, even if the body data is leaked from the colony server through unauthorized access or the like, the hash value of the encryption key containing the partial data paired with the unauthorizedly leaked body data is updated at predetermined intervals, and thus an encryption key containing a hash value matching the hash value of the body data no longer exists. Thus, an encryption key necessary for recovering the data to be managed cannot be reached by analyzing the unauthorizedly leaked body data, thereby substantially precluding recovery of the data to be managed.

Further, with the data management system and the like according to the present invention, the center server can store only the partial data as part of the data to be managed rather than the entire data to be managed in the blockchain, and thus can manage the blockchain within a relatively small storage area. Thus, when forming a new block in the blockchain, the center server can perform calculation of a hash value or the like in accordance with a relatively small amount of information, thereby significantly reducing an amount of calculation using the computer. Also, the center server can be operated in reliable institutions such as governments or banks to simplify or omit verification for guaranteeing fairness of the blockchain, thereby reducing an enormous amount of calculation using the computer and power consumption along therewith.

BRIEF DESCRIPTION OF DRAWINGS

FIG. 9 shows a sequence of processing for transferring data to be managed between terminals connected to the same colony server.

FIG. 18 shows a configuration of the blockchain managed by the center server.

FIG. 19 shows an outline of various types of information stored in a database of the center server.

FIG. 20 shows an outline of information stored in a database of the colony server.

DESCRIPTION OF EMBODIMENT

Figure 1:
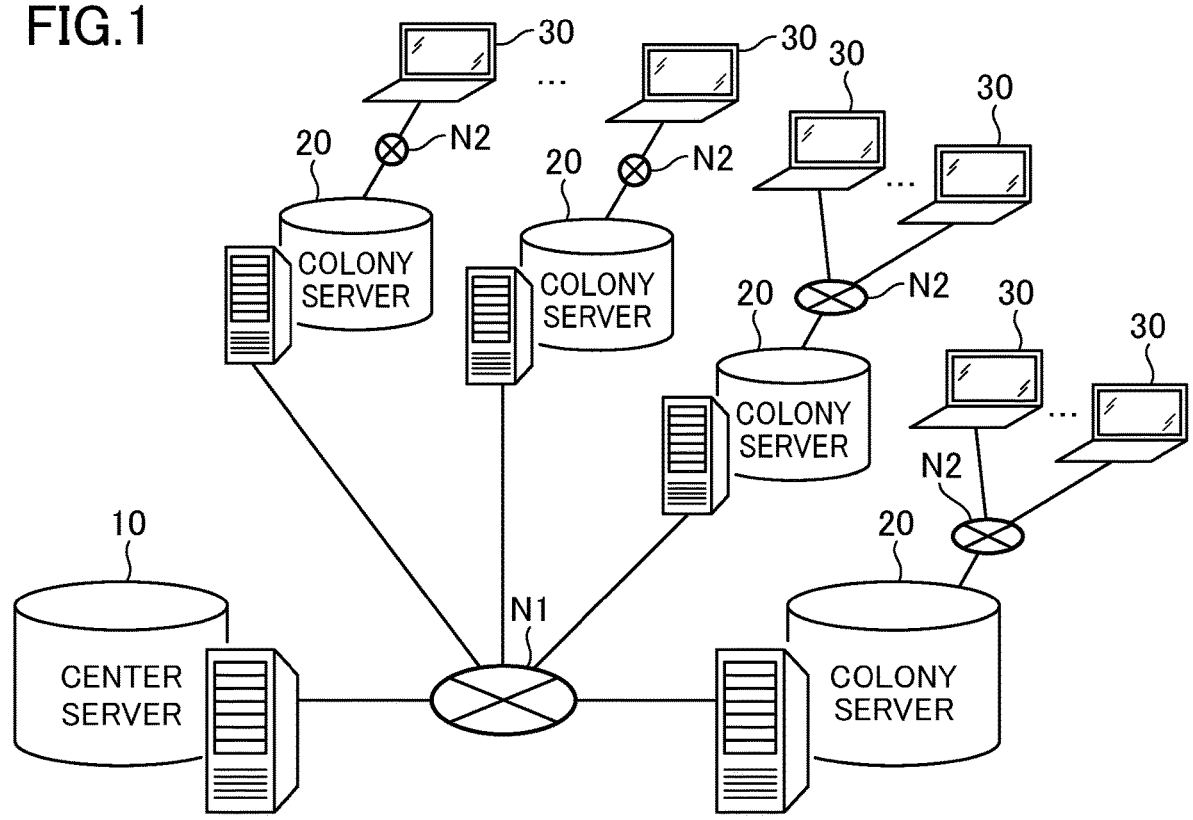
FIG. 1 is a schematic configuration diagram (system configuration diagram) of a data management system according to an embodiment of the present invention.

Now, with reference to the drawings, an embodiment of the present invention will be described. Throughout the drawings for illustrating the embodiment, the same components are denoted by the same reference numerals in principle, and repeated descriptions thereof are omitted. Embodiments of the present invention are not independent but may be combined as appropriate.

FIG. 1 is a system configuration diagram of a data management system according to an embodiment of the present invention. The data management system illustratively includes a center server 10, a colony server 20, and an information processing terminal 30. The information processing terminal 30 is a terminal connectable to the Internet, such as a personal computer, a notebook computer, a smartphone, or a cellphone. The data management system according to the present invention manages electronic data such as valuables, secret information, electronic exchange, or additional telegraphic messages. Here, electronic data to be managed is referred to as data to be managed. The data to be managed is data that can be stored in storage means of each of the center server 10, the colony server 20, and the information processing terminal 30 of the data management system according to the present invention and can be transmitted and received as required. The data to be managed may be any data that can be handled as electronic data by the data management system according to the present invention. The valuables have financial values and are, for example, cryptocurrency, virtual currency, electronic currency, valuable securities, and secret information. The center server 10 and the colony server 20 are connected through a network N1. The network N1 is, for example, an intranet connected through a dedicated line, and is a closed network. The colony server 20 and the information processing terminal 30 are connected through a network N2. The network N2 is, for example, an open network such as the Internet. The networks N1 and N2 are not limited thereto, and a closed network or an open network may be selected as appropriate depending on a requested security level or the like.

The information processing terminal 30 can access the colony server 20 through, for example, the network N2 such as the Internet, but cannot directly access the center server 10 because of being not connected through the network N1 as the closed network to the center server 10. Only the colony server 20 connected to the information processing terminal 30 through the network N2 can access the center server 10. In the embodiment in FIG. 1, one center server 10 is shown, but a plurality of center servers 10 may be provided.

Figure 2:
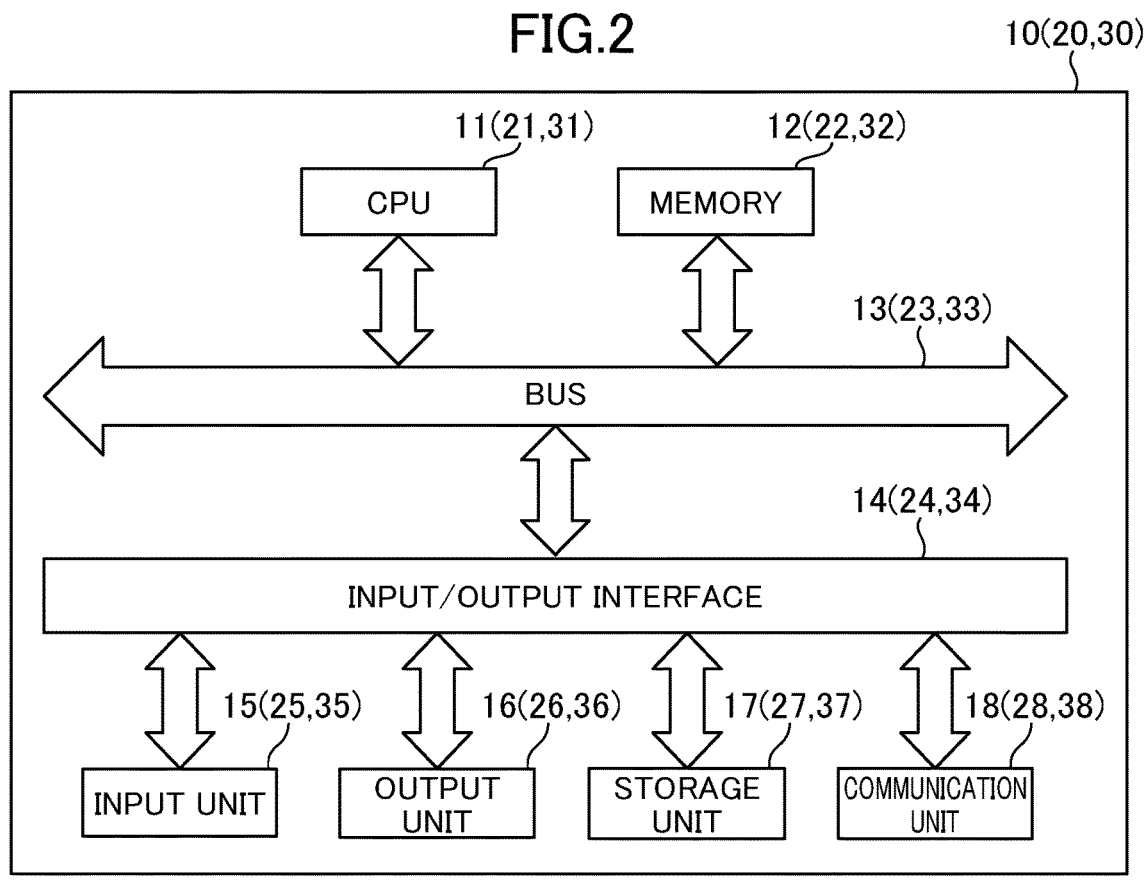
FIG. 2 is a schematic configuration diagram (block diagram) of an example of a hardware configuration of servers and an information processing terminal according to the embodiment of the present invention.

FIG. 2 is a block diagram of an example of a hardware configuration of the servers and the information processing terminal according to the embodiment of the present invention. In FIG. 2, reference numerals corresponding to hardware of the center server 10 are not in parentheses, but reference numerals corresponding to hardware of the colony server 20 and the information processing terminal 30 are in parentheses.

The center server 10 illustratively includes a central processing unit (CPU) 11, a memory 12 such as a read only memory (ROM) and a random access memory (RAM), a bus 13, an input/output interface 14, an input unit 15, an output unit 16, a storage unit 17, and a communication unit 18.

The CPU 11 performs various types of processing in accordance with a program recorded in the memory 12 or a program loaded from a storage unit 27 to the memory 12. The CPU 11 can perform, for example, a program for causing a server device to function as the center server of the present invention. Also, a function of at least part of the center server can be implemented like hardware in an application specific integrated circuit (ASIC) or the like. The same applies to the other server and the information processing terminal in the present invention.

The memory 12 stores data required for the CPU 11 to perform various types of processing, as appropriate. The CPU 11 and the memory 12 are connected through the bus 13. The input/output interface 14 is also connected to the bus 13. The input unit 15, the output unit 16, the storage unit 17, and the communication unit 18 are connected to the input/output interface 14.

The input unit 15 is constituted by various buttons, a touch panel, a microphone, or the like, and inputs various types of information in accordance with an instruction operation by an administrator or the like of the center server 10. The input unit 15 may be realized by an input device such as a keyboard or a mouse independent of a body housing other units of the center server 10.

The output unit 16 is constituted by a display, a speaker, or the like, and outputs image data or audio data. The image data or audio data output by the output unit 16 is output from the display or the speaker so as to be recognizable as an image or music by a user.

The storage unit 17 is constituted by a semiconductor memory such as a dynamic random access memory (DRAM) and stores various types of data.

The communication unit 18 achieves communication with other devices. For example, the communication unit 18 communicates with the colony server 20 through the network N1.

The center server 10 includes a drive (not shown) as required. To the drive, a removable medium constituted by, for example, a magnetic disk, an optical disk, a magnetooptical disk, or a semiconductor memory is mounted as appropriate. The removable medium stores a program for conducting a cryptocurrency transaction, or various types of data such as text data or image data. The program or various types of data such as image data read from the removable medium by the drive is installed in the storage unit 17 as required.

Next, a hardware configuration of the colony server 20 will be described. As shown in FIG. 2, the colony server 20 illustratively includes a CPU 21, a memory 22, a bus 23, an input/output interface 24, an input unit 25, an output unit 26, a storage unit 27, and a communication unit 28. These units have the same functions as the units of the same names with different reference numerals included in the center server 10. Thus, overlapping descriptions will be omitted. The same applies to the information processing terminal 30. When the information processing terminal 30 is a portable device, hardware of the information processing terminal 30 and a display and a speaker may be integrated.

Figure 3:
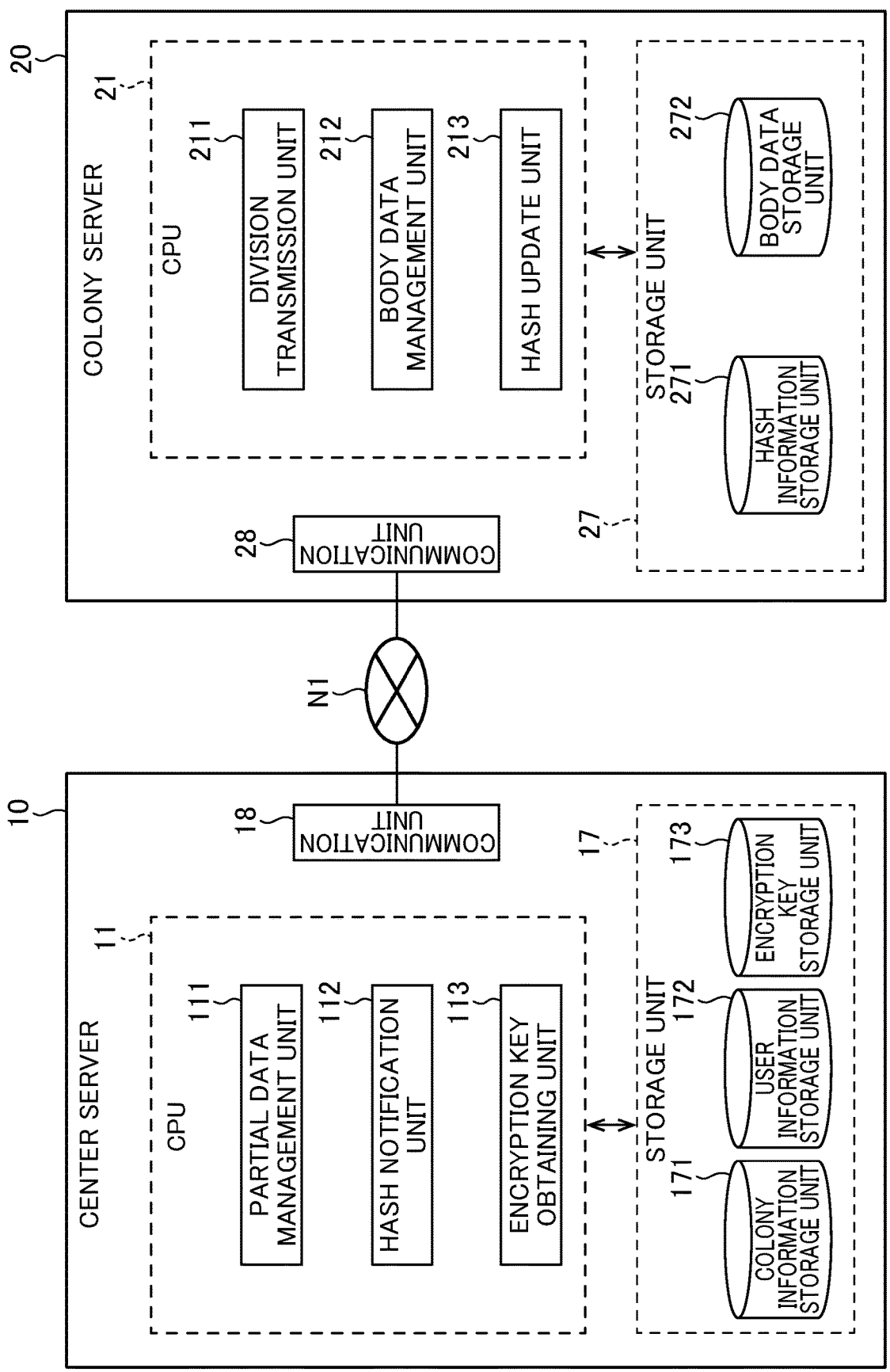
FIG. 3 is a schematic configuration diagram (block diagram) of a center server and a colony server according to the embodiment of the present invention.

With reference to FIG. 3, functional configurations of the center server 10 and the colony server 20 that constitute the data management system will be described. FIG. 3 is a block diagram of the center server and the colony server according to the embodiment of the present invention. When the center server 10 perform a program for data management on the center server side, a partial data management unit 111, a hash notification unit 112, and an encryption key obtaining unit 113 function in the CPU 11. A colony information storage unit 171, a user information storage unit 172, and an encryption key storage unit 173 are set in a partial storage area of the storage unit 17. Details of information stored in the colony information storage unit 171, the user information storage unit 172, and the encryption key storage unit 173 will be described later.

The partial data management unit 111 of the center server 10 can encrypt partial data as part of data to be managed transmitted from the colony server 20, generate a block that stores the encrypted partial data as an encryption key, and add the block to a blockchain. The partial data management unit 111 may encrypt the partial data together with at least one of a filename and a time of the data to be managed, and the encryption key may contain the partial data and at least one of the filename and the time.

The hash notification unit 112 can update a block hash value of the block that stores the encryption key at predetermined intervals to a hash value different from the block has value, and transmit the updated block hash value as a new hash value to the colony server. The predetermined interval may be 24 hours or shorter, and may be, for example, 1 hour, 6 hours, 12 hours, 24 hours, or the like. The predetermined interval may be longer than 24 hours.

The encryption key obtaining unit 113 can identify an encryption key stored in the encryption key storage unit 173 and obtain the encryption key in accordance with a hash value contained in a request (request related to the data to be managed) from the colony server 20. For example, when the hash value stored together with the encryption key in the encryption key storage unit 173 is updated at predetermined intervals, the encryption key obtaining unit 113 can identify, from the encryption key storage unit 173, a desired encryption key using a new hash value and obtain the encryption key in response to a request related to data to be managed containing the new hash value from the colony server 20.

When the colony server 20 performs a program for data management on the colony server side, a division transmission unit 211, a body data management unit 212, and a hash update unit 213 function in the CPU 21. A hash information storage unit 271 and a body data storage unit 272 are set in a partial storage area of the storage unit 27. Details of information stored in the hash information storage unit 271 and the body data storage unit 272 will be described later.

The division transmission unit 211 in the colony server 20 can divide data to be managed obtained or generated in response to the request related to the data to be managed from the information processing terminal 30 into partial data containing data of a predetermined size from a beginning, and body data containing data of the predetermined size +1 and thereafter, and transmit the partial data to the center server 10. The predetermined size may be, for example, 30 bytes or less from the beginning of the data to be managed. The predetermined size is not limited thereto, and may be set as appropriate.

The division transmission unit 211 may also divide the data to be managed into partial data containing data of a predetermined size from any one part of the data to be managed in place of the data of the predetermined size from the beginning, and body data containing data of a remaining part other than the any one part (that is, the partial data) of the data to be managed in place of the data of the predetermined size +1 and thereafter.

The body data management unit 212 can receive the block hash value from the center server 10 and store, in the hash information storage unit 271, the block hash value associated with the body data as a hash value of the body data. The body data management unit 212 can also store, in the body data storage unit 272, the body data of the data to be managed uploaded from the information processing terminal 30 to the colony server 20.

The hash update unit 213 can receive the new hash value notified by the hash notification unit 112 of the center server 10, and update the hash value stored associated with the body data to the new hash value. The new hash value is different from the hash value already stored associated with the body data.

Figure 4:
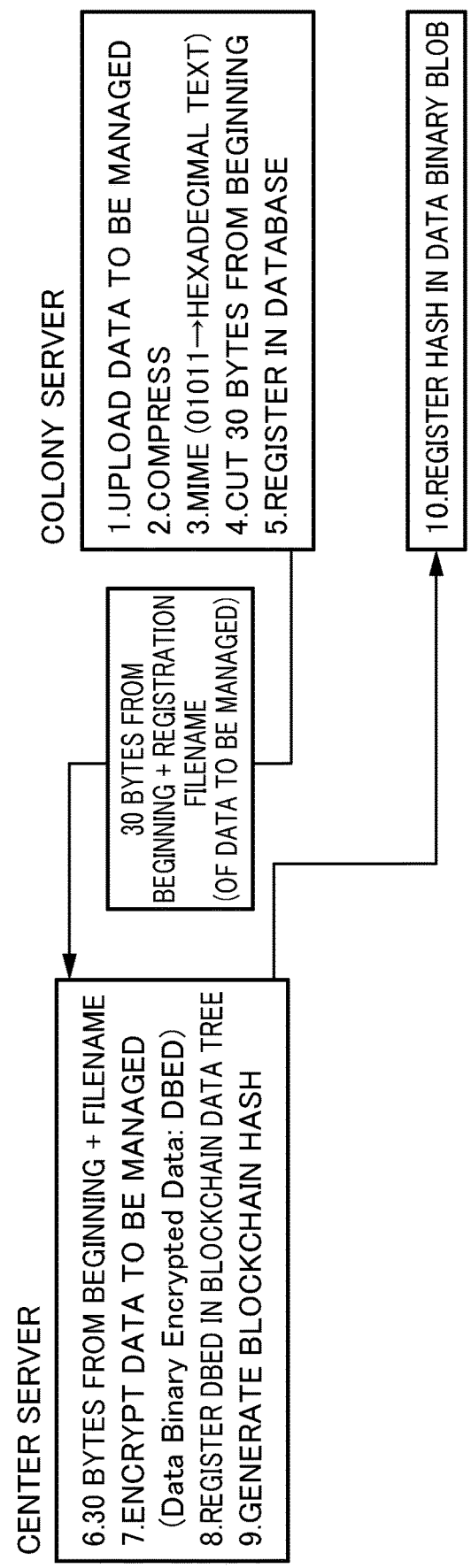
FIG. 4 shows an example of a data processing procedure of the center server and the colony server.

FIG. 4 shows an example of a data processing procedure of the center server and the colony server. First, the colony server 20 uploads data to be managed from the user's information processing terminal 30 (or the colony server 20 generates data to be managed) (step 1), compresses the data to be managed (step 2), and replaces a bit string of 0 and 1 in the compressed data corresponding to the data to be managed with hexadecimal text data in accordance with Multipurpose Internet Mail Extensions (MIME) (step 3). In the example in FIG. 4, the data to be managed is compressed, but not limited thereto, the data to be managed needs not be compressed. MIME is a standard to extend email standards through the Internet so as to handle various formats.

Then, the colony server 20 cuts, for example, 30 bytes from a beginning of the hexadecimal text data corresponding to the data to be managed as partial data (step 4), and registers (stores) data of 31 bytes and thereafter as body data in a database (for example, the body data storage unit 272) (step 5).

Then, the colony server 20 transmits the partial data (data of 30 bytes from the beginning) together with a registration filename of the data to be managed to the center server 10. The center server 10 receives the partial data (data of 30 bytes from the beginning) and the filename of the data to be managed (step 6), and encrypts the partial data as part of the data to be managed in accordance with the partial data and the filename (step 7). For example, the center server 10 encrypts the partial data and generates an encryption key (also referred to as data binary encrypted data (DBED)). The center server 10 adds (registers) the encryption key (DBED) as one block of a blockchain (or a blockchain data tree) (step 8), and generates a blockchain hash, that is, calculates a block hash value of the block added to the blockchain (step 9). Finally, the center server 10 transmits the block hash value to the colony server 20, and the colony server 20 registers the block hash value that is binary data as a binary large object (BLOB) in a database (for example, the hash information storage unit 271) (step 10).

Figure 5:
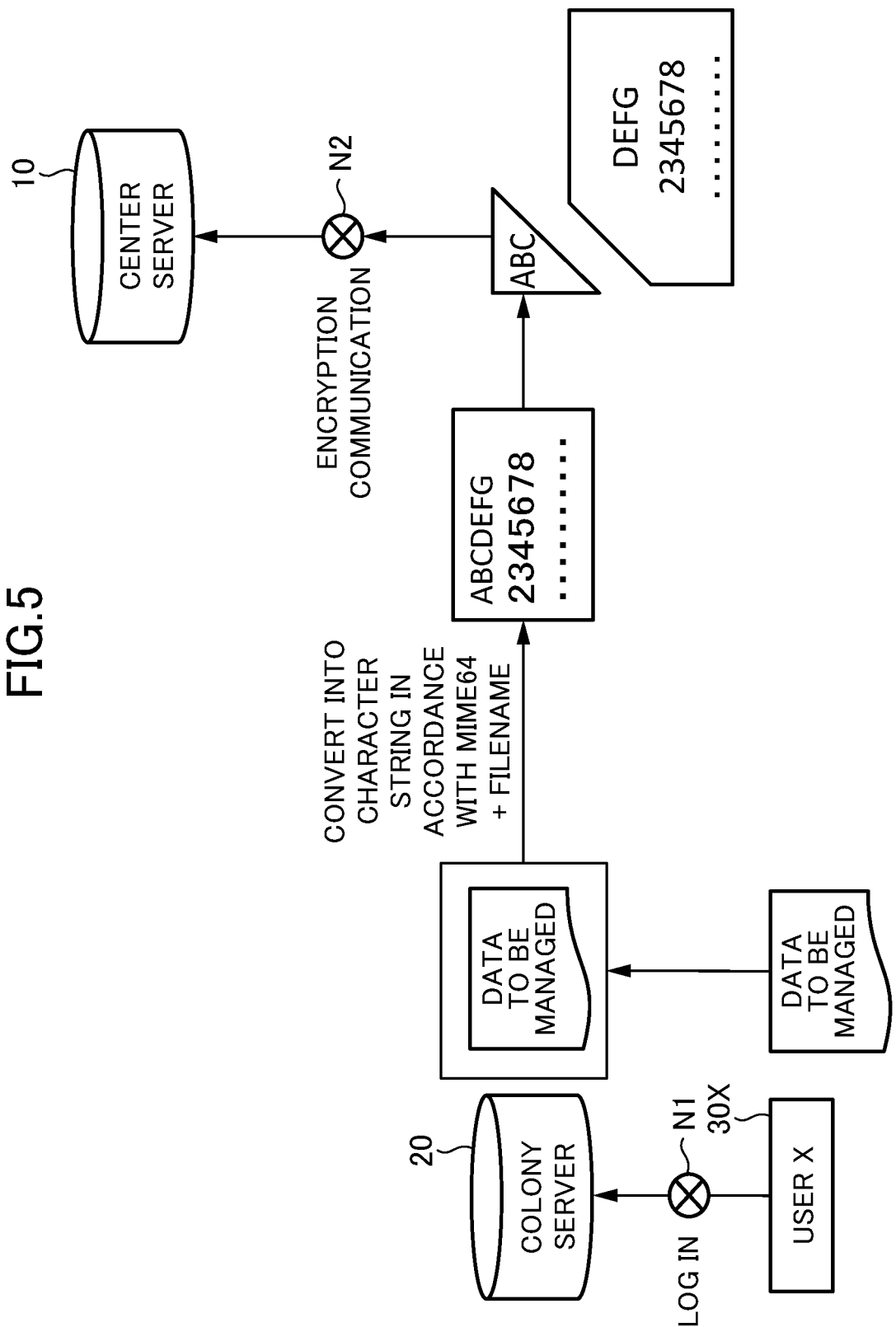
FIG. 5 shows an outline of registration of data to be managed from the colony server to the center server.

FIG. 5 shows an outline of registration of the data to be managed from the colony server to the center server. A user X uses an information processing terminal 30X to log in the colony server 20 and upload the data to be managed to the colony server 20 through the network N1. As described above, the data to be managed uploaded to the colony server 20 is converted into a character string of, for example, ABCDEFG2345678 in accordance with MIME (for example, MIME64), and passed to a next process together with the filename of the data to be managed. The colony server 20 divides the data to be managed converted into the character string into partial data (for example, ABC) of a predetermined size from a beginning, and body data of the predetermined size +1 and thereafter (for example, DEFG2345678), and transmits the partial data together with the filename to the center server 10 by encryption communication through the network N2. In the examples in FIGS. 4 and 5, the data of the predetermined size from the beginning of the data to be managed converted into the character string is the partial data, and the subsequent data is the body data, but not limited thereto. The partial data may contain data of a predetermined size from any one part of the data to be managed in place of the data of the predetermined size from the beginning, and the body data may contain data of a remaining part other than the any one part of the data to be managed in place of the data of the predetermined size +1 and thereafter.

As such, with the data management system according to the embodiment of the present invention, the colony server 20 stores the partial data containing the data of the predetermined size from the beginning of the data to be managed received from the information processing terminal 30, and the center server 10 stores the body data containing the data of the predetermined size +1 and thereafter. Thus, the data to be managed is managed in a divided manner. Also, even if the body data is leaked from the colony server 20 through unauthorized access or the like, the body data is merely part of the data to be managed, and has no value on its own. This can achieve robust security against unauthorized access.

Also, with the data management system according to the embodiment of the present invention, the center server 10 can store only the partial data as part of the data to be managed rather than the entire data to be managed in the blockchain, and thus can manage the blockchain within a relatively small storage area. Thus, when forming a new block in the blockchain, the center server 10 can perform calculation of a hash value or the like in accordance with a relatively small amount of information, thereby significantly reducing an amount of calculation using the computer such as the center server 10. Also, the center server 10 can be operated in reliable institutions such as governments or banks to simplify or omit verification for guaranteeing fairness of the blockchain, thereby reducing an enormous amount of calculation using the computer and power consumption along therewith.

Figure 6:
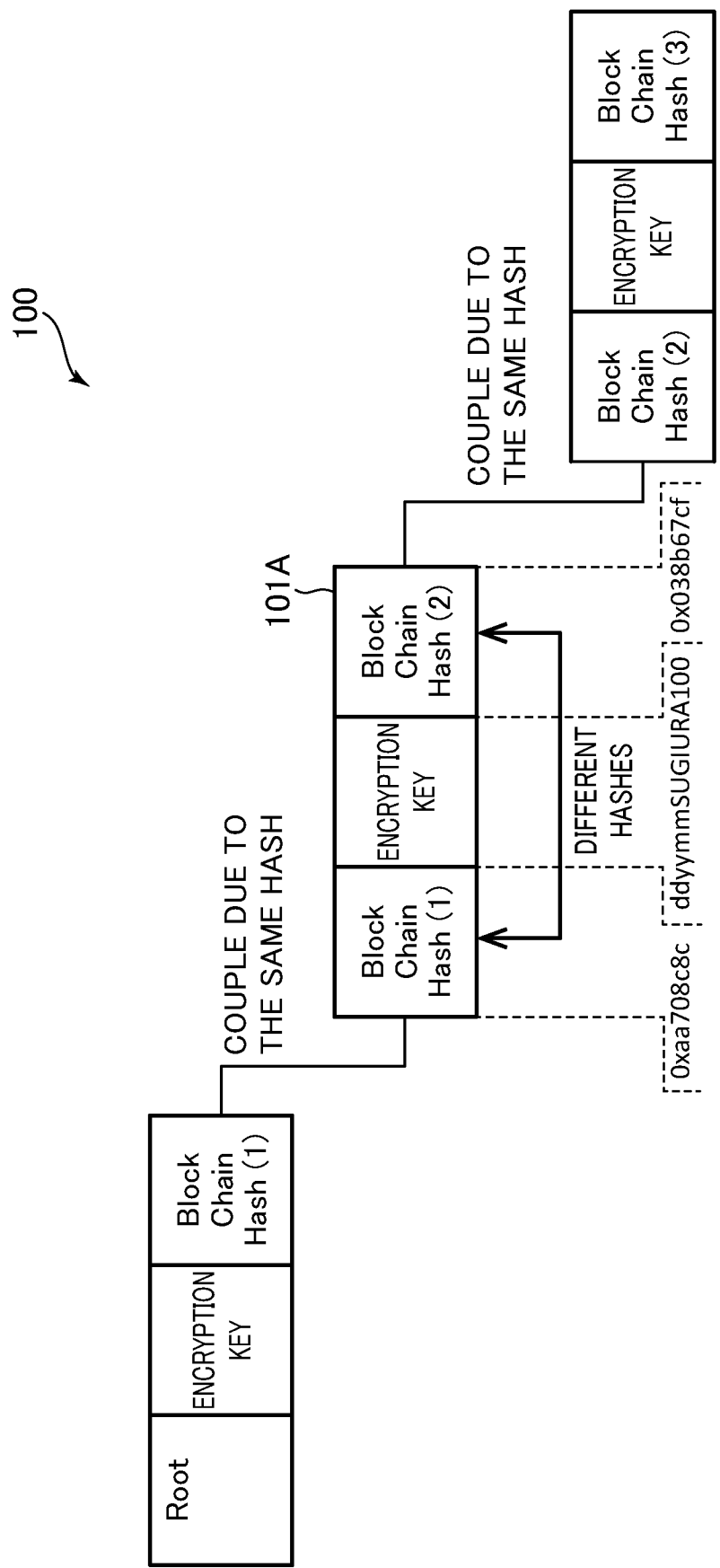
FIG. 6 schematically shows an outline of a basic configuration of a blockchain managed by the center server.

FIG. 6 shows an outline of a basic configuration of a blockchain managed by the center server. One block 101A of a blockchain 100 contains two different block hash values (Block Chain Hash(1) and Block Chain Hash (2), for example, 0xaa708c8c and 0x038b67cf), and an encryption key (for example, ddyymmSUGIURA100) encrypting partial data of data to be managed. One block hash value (Block Chain Hash (1)) is the same as a block hash value of a preceding block, and the block 101A is coupled to the preceding block due to the same hash value. Similarly, the other block hash value (Block Chain Hash (2)) is the same as a block hash value of a following block, and the block 101A is also coupled to the following block due to the same hash value.

Figure 7:
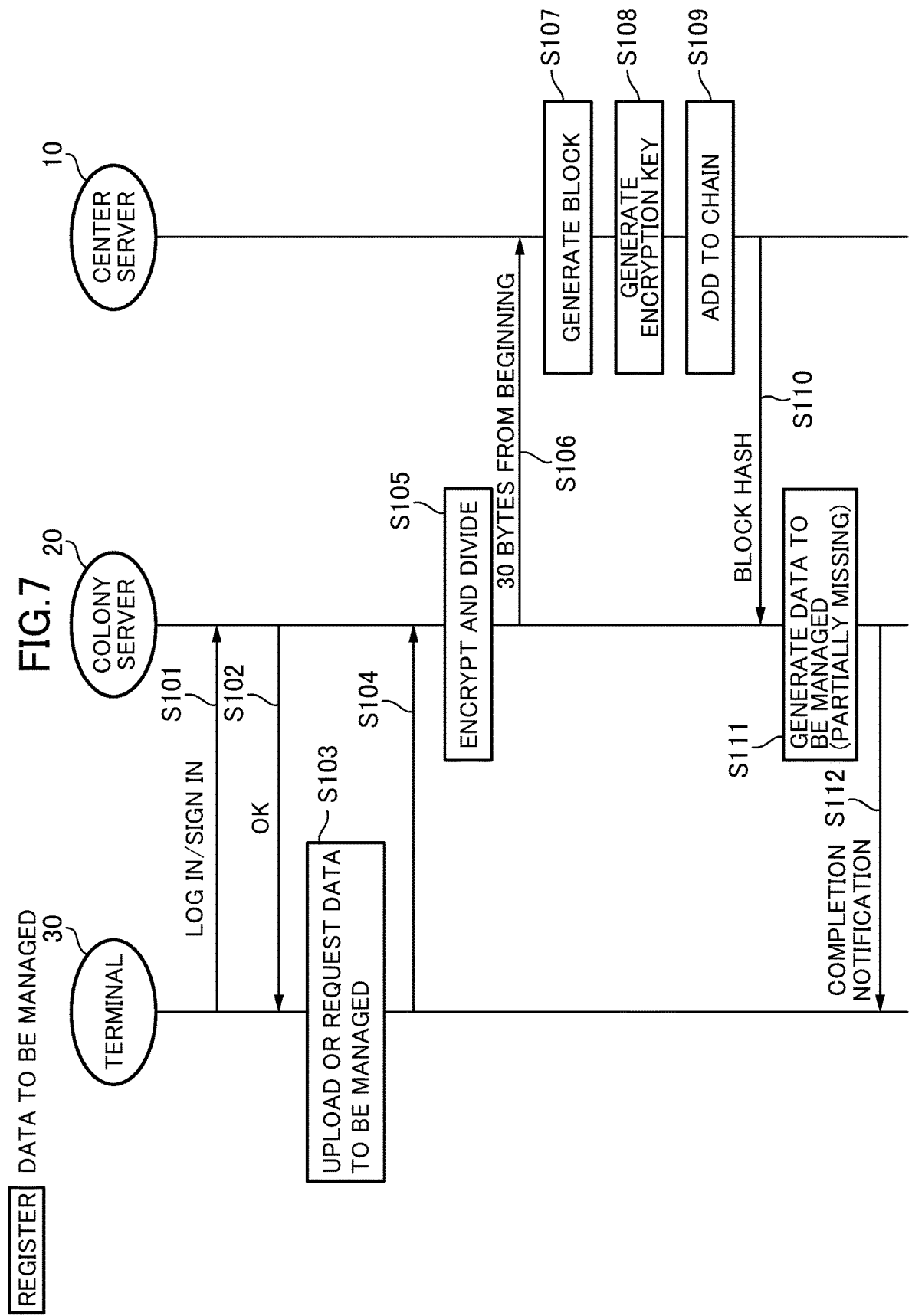
FIG. 7 shows a sequence of processing for registering data to be managed in the center server.

FIG. 7 shows a sequence of processing for registering data to be managed in the center server. A user uses the information processing terminal 30 to log in (sign in) and access the colony server 20, for example, through the Internet (step S101). When the login using the user's information processing terminal 30 is successful, the colony server 20 transmits a response of "login success (OK)" to the information processing terminal 30 (step S102). Then, the user selects, on the information processing terminal 30, upload of data to be managed or request for generation of the data to be managed (step S103), and uploads the data to be managed to the colony server 20 or transmits a request for generation of the data to be managed (step S104). As described above, the colony server 20 performs encryption of the uploaded or generated data to be managed, such as compression or conversion into a character string. For example, the colony server 20 divides the data to be managed into partial data of 30 bytes from a beginning and body data of 31 bytes and thereafter, and transmits the partial data of 30 bytes from the beginning to the center server 10 (step S106).

The center server 10 generates one block to be added to a blockchain (step S107), encrypts the partial data of 30 bytes from the beginning and at least one of time (for example, an upload date and time or a creation date and time) related to the data to be managed and a filename corresponding to the data to be managed, and generates an encryption key containing the partial data and at least one of the filename and the time (for example, an upload date and time or a creation date and time) (step S108). In this embodiment, the time and the filename are used in addition to the partial data for encryption, but not limited thereto, other character strings, data (for example, a user's login ID or a password), or the like may be used. The encryption key can be decoded to recover (extract) the partial data contained in the encryption key.

The center server 10 adds the generated block containing the encryption key to the blockchain (step S109), and transmits a block hash value of the added block to the colony server 20 (step S110). The colony server 20 stores the received block hash value together with the body data in the database (body data storage unit 272), and generates data to be managed without the partial data (that is, body data) (step S111). Finally, when completing the generation of the data to be managed, the colony server 20 transmits completion notification to the information processing terminal 30 (step S112).

Figure 8:
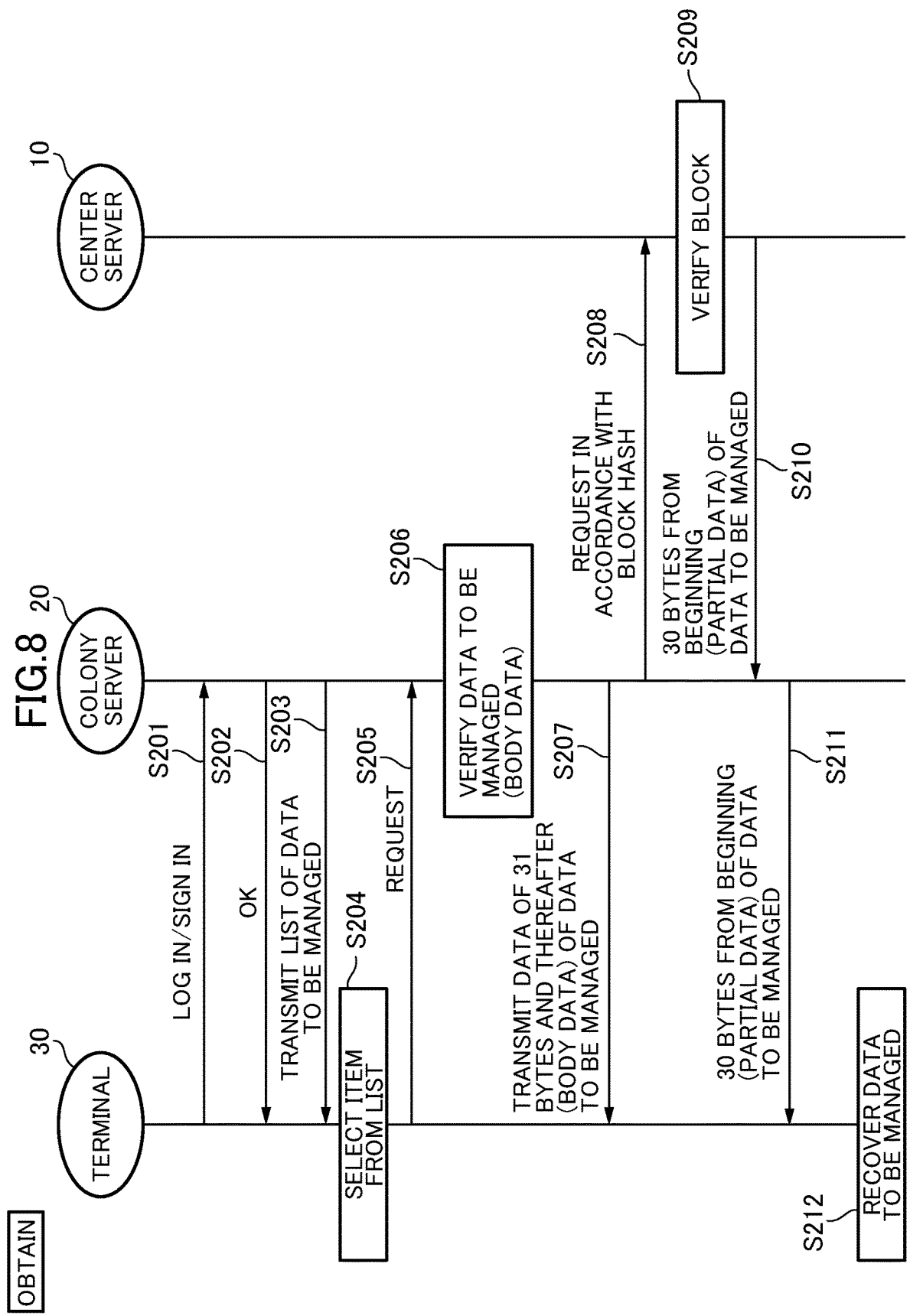
FIG. 8 shows a sequence of processing for obtaining data to be managed from the center server.

FIG. 8 shows a sequence of processing for obtaining data to be managed from the center server. A user uses the information processing terminal 30 to log in (sign in) and access the colony server 20, for example, through the Internet (step S201). When the login using the user's information processing terminal 30 is successful, the colony server 20 transmits a response of "login success (OK)" to the information processing terminal 30 (step S202), and also transmits a list of data to be managed or the like (step S203).

The user selects an item required for obtaining data to be managed from the list of data to be managed or the like displayed on a screen of the information processing terminal 30 (step S204), and the information processing terminal 30 transmits a request for obtaining data to be managed together with the item selected by the user to the colony server 20 (step S205). The colony server 20 identifies and verifies the requested data to be managed (body data corresponding thereto) from the database in response to the request from the information processing terminal 30 (step S206). If no problem is found in a verification result, the colony server 20 transmits body data containing data of 31 bytes and thereafter of the data to be managed to the information processing terminal 30 (step S207), and makes a request for partial data corresponding to the body data to the center server 10 in accordance with a block hash value associated with the body data and stored (step S208).

The center server 10 verifies a block in the blockchain in response to the request (step S209), recovers (decodes), from an encryption key, partial data of 30 bytes from a beginning of data to be managed, and transmits the partial data to the colony server 20 (step S210). The colony server 20 transmits the received partial data to the information processing terminal 30 (step S211), and the information processing terminal 30 couples the received partial data to the body data to generate data to be managed (step S212).

FIG. 9 shows a sequence of processing for transferring data to be managed between terminals connected to the same colony server. When a user X of an information processing terminal 30X transfers data to be managed to a user Y of an information processing terminal 30Y, the terminals 30X and 30Y being connected to the same colony server 20, the user X uses the information processing terminal 30X to log in (sign in) and access the colony server 20, for example, through the Internet (step S301). When the login using the user's information processing terminal 30X is successful, the colony server 20 transmits a response of "login success (OK)" to the information processing terminal 30X (step S302), and also transmits a list of data to be managed or the like (step S303).

The user X selects an item required for transferring data to be managed from the list of data to be managed or the like displayed on a screen of the information processing terminal 30X (step S304), inputs a user ID of the user Y as a transferee (step S305), and transmits a request for transfer to the colony server 20 (step S306).

The colony server 20 verifies the user ID of the transferee (step S307). If no problem is found, the colony server 20 generates a download URL (step S308), makes a request for an email address of the user Y as the transferee to the center server 10 (step S309), and obtains the email address together with a response (OK) (step S310). The colony server 20 emails the download URL to the obtained email address (information processing terminal 30Y) (step S311).

The user Y as the transferee checks the email on the information processing terminal 30Y, logs in the colony server 20 using the download URL, and downloads body data containing data of 31 bytes and thereafter of data to be managed (step S312). When the body data is downloaded, the colony server 20 transmits a block hash value of the body data to the center server 10 (step S313). The center server 10 identifies a block having a hash value matching the received hash value in the blockchain, and verifies data to be managed contained in the block (step S314). If a verification result is correct, the center server 10 transmits partial data containing data of 30 bytes from a beginning of the data to be managed to the colony server 20 (step S315), and the colony server 20 transmits the received partial data to the information processing terminal 30Y (step S316). Finally, the information processing terminal 30Y couples the received partial data to the body data to recover (generate) data to be managed (step S317).

Figure 10:
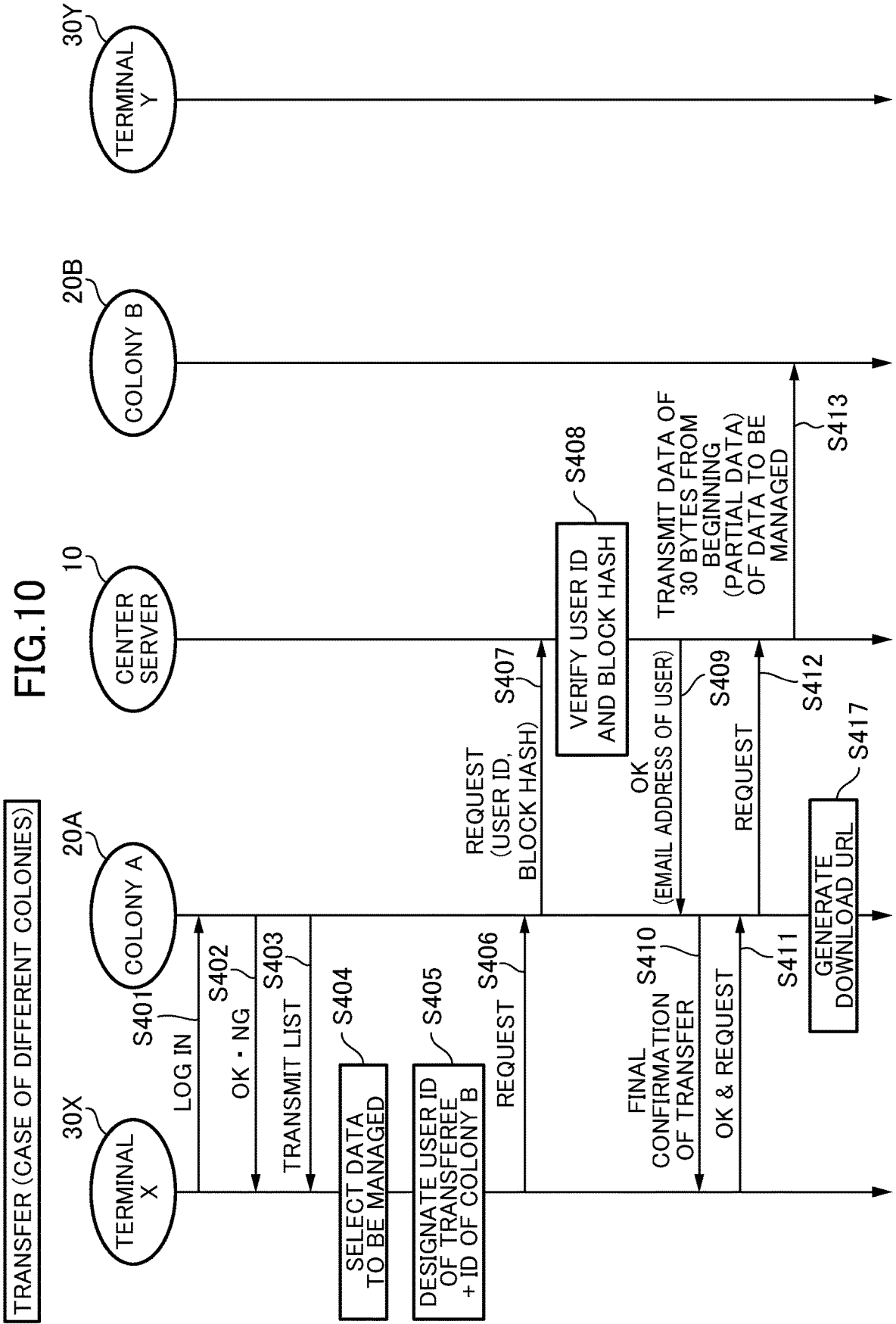
FIG. 10 shows a sequence of processing for transferring data to be managed between terminals connected to different colony servers.
Figure 11:
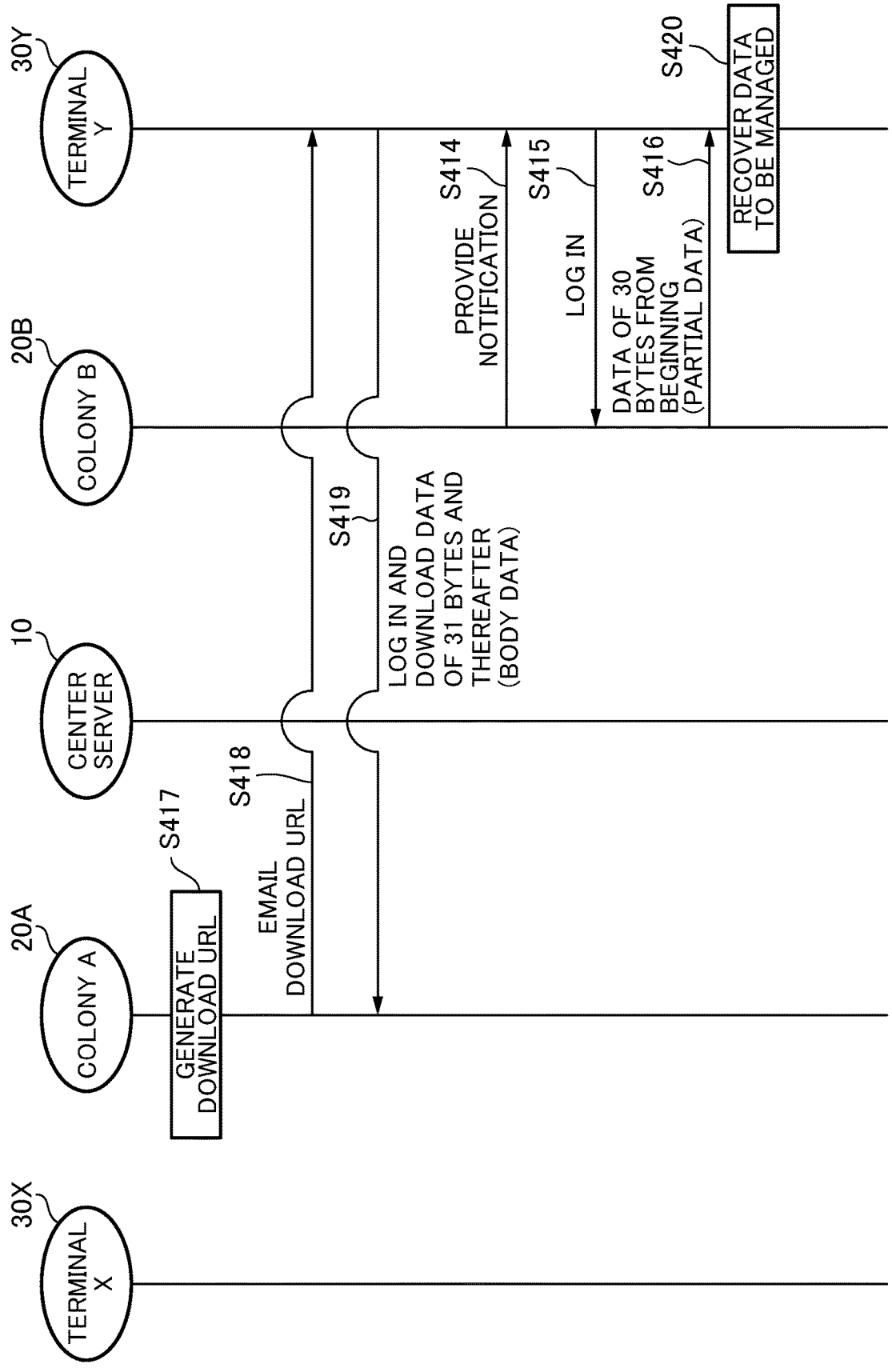
FIG. 11 shows the sequence of processing for transferring data to be managed between terminals connected to different colony servers.

FIGS. 10 and 11 show a sequence of processing for transferring data to be managed between terminals connected to different colony servers. FIGS. 10 and 11 together show a sequence of processing for transferring data to be managed from an information processing terminal 30X connected to a colony server 20A (colony A) to an information processing terminal 30Y connected to a colony server 20B (colony B).

First, with reference to FIG. 10, a user X uses the information processing terminal 30X to log in (sign in) and access the colony server 20A, for example, through the Internet (step S401). When the login using the user's information processing terminal 30X is successful, the colony server 20A transmits a response of "login success (OK)" to the information processing terminal 30X (or when the login is unsuccessful, the colony server 20A transmits a response of "login failure (NG)" to the information processing terminal 30X) (step S402), and transmits a list of data to be managed or the like (step S403).

The user X selects an item required for transferring data to be managed from the list of data to be managed or the like displayed on a screen of the information processing terminal 30X (step S404), designates a user ID of a user Y as a transferee and an ID of the colony server 20B (step S405), and transmits a request for transfer to the colony server 20A (step S406). The colony server 20A identifies body data of the requested data to be managed, and transmits a request containing a block hash value of the body data and the user ID of the user Y as the transferee to the center server 10 (step S407).

The center server 10 verifies the received user ID and the block hash value (step S408). If a verification result is correct, the center server 10 transmits a response (OK) of that fact and an email address of the user Y as the transferee to the colony server 20A, (step S409), and the colony server 20 transmits a final confirmation of whether or not to transfer the data to be managed to the information processing terminal 30X (step S410). The information processing terminal 30X transmits a response (OK) of approval of transfer and a final request for transfer to the colony server 20A, (step S411), and the colony server 20A transmits the request to the center server 10 (step S412).

The center server 10 transmits partial data containing data of 30 bytes from a beginning of the data to be managed to the colony server 20B (step S413). With reference to FIG. 11, the colony server 20B provides notification of the transfer of the data to be managed from the user X to the information processing terminal 30Y of the user Y as the transferee (step S414). The user Y uses the information processing terminal 30Y to log in and access the colony server 20B in accordance with the notification displayed on a screen of the information processing terminal 30Y (step S415), and the information processing terminal 30Y receives the partial data containing data of 30 bytes from the beginning of the data to be managed transmitted from the center server 10 (step S416).

Again with reference to FIG. 10, the colony server 20A generates an URL for downloading body data containing data of 31 bytes and thereafter of the data to be managed immediately after or substantially simultaneously with transmitting the request to the center server 10 (step S417). With reference to FIG. 11, after generating the download URL (step S417), the colony server 20A emails the download URL to the information processing terminal 30Y (step S418). The user Y as the transferee checks the email on the information processing terminal 30Y, logs in the colony server 20A using the download URL, and downloads the body data containing the data of 31 bytes and thereafter of the data to be managed (step S419). Finally, the information processing terminal 30Y couples the received partial data to the body data to recover data to be managed (step S420).

Figure 12:
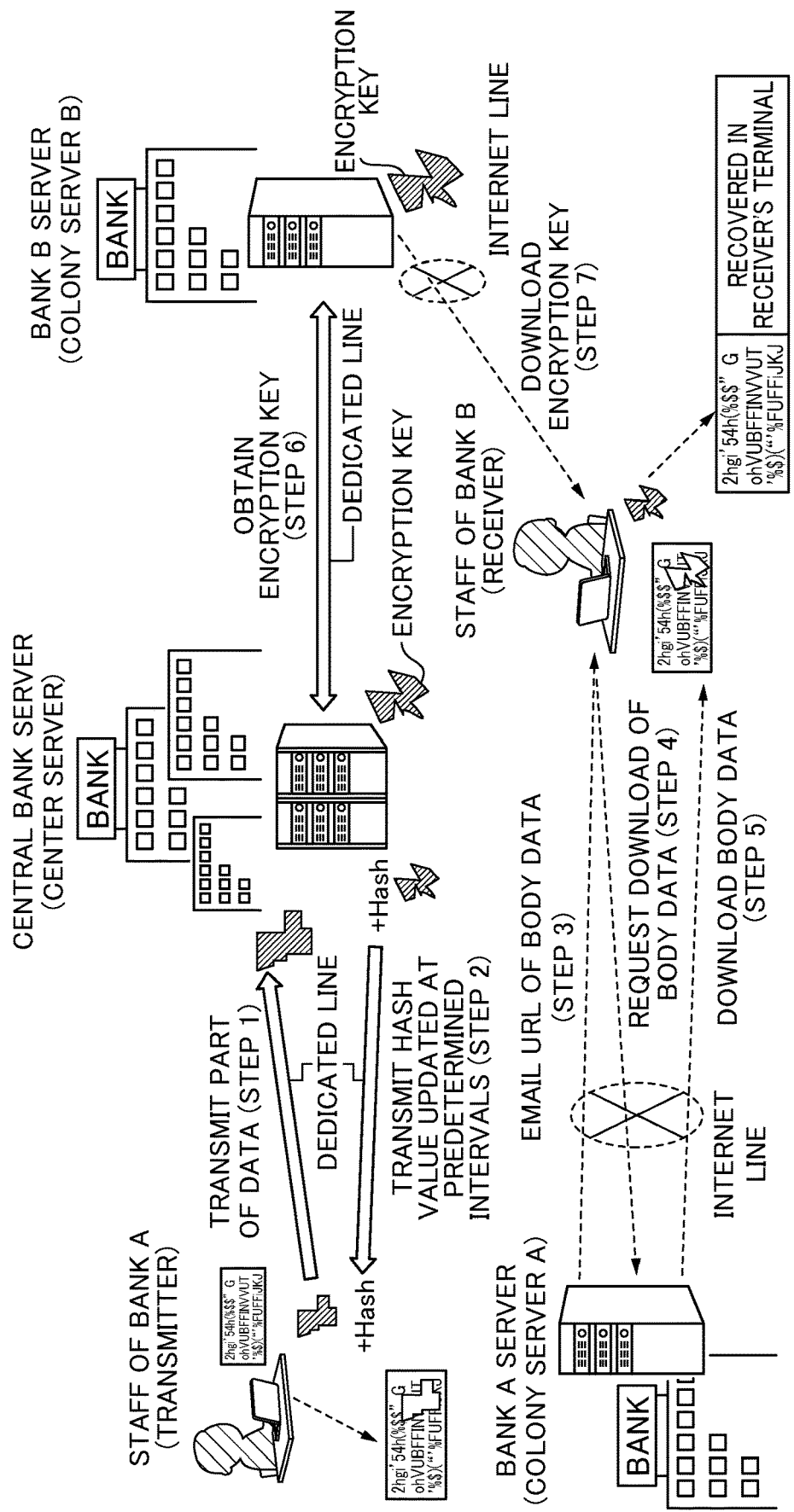
FIG. 12 shows an example of the data management system according to the present invention applied to a transaction of financial instruments between banks.

FIG. 12 shows an example of the data management system according to the present invention applied to a transaction of financial instruments between banks. With the system of the present invention, for example, a given plurality of authenticators in a central bank (for example, the Bank of Japan) can easily perform authentication of remittance from a local bank A to a local bank B. The plurality of authenticators perform authentication to prevent remittance by impersonation or the like. The remittance (for example, transmission of electronic currency as data to be managed) from the bank A to the bank B can be achieved by the processing for registering data to be managed in the center server in FIG. 7, and the processing for transferring data to be managed between terminals connected to different colony servers in FIGS. 10 and 11.

A staff of the bank A (transmitter) uses a terminal connected to a bank A server (colony server A) to log in and access the bank A server through a public line such as the Internet. When the login using the terminal of the staff of the bank A is successful, the bank A server transmits a response of "login success (OK)" to the terminal. Then, the staff of the bank A selects, on the terminal, upload of electronic currency as an example of data to be managed or request for generation of the electronic currency, and uploads the electronic currency to the bank A server or transmits a request for generation of the electronic currency. The bank A server performs encryption of the uploaded or generated electronic currency, such as compression or conversion into a character string. For example, the bank A server divides the electronic currency into partial data of 30 bytes from a beginning and body data of 31st byte and thereafter, and transmits the partial data of 30 bytes from the beginning through a dedicated line (closed network) to a central bank server (center server) (step 1).

The central bank server generates one block to add the partial data of 30 bytes from the beginning to a blockchain, encrypts the partial data of 30 bytes from the beginning and at least one of time (for example, an upload date and time or a creation date and time) related to electronic currency as data to be managed and a filename corresponding to the electronic currency as the data to be managed, and generates an encryption key containing the partial data and at least one of the filename and the time (for example, an upload date and time or a creation date and time). The central bank server adds the generated block containing the encryption key to the blockchain, and transmits a block hash value ("+Hash" in FIG. 12) of the added block to the bank A server (step 2). The block hash value is updated at predetermined intervals by the central bank server and transmitted to the bank A server.

The bank A server stores the received block hash value together with the body data in a database, and generates electronic currency without the partial data (that is, body data). Finally, when completing registration (generation) of the electronic currency, the bank A server transmits completion notification to the terminal of the staff of the bank A. When registered in the central bank server, the electronic currency as the data to be managed is registered to be permanently managed in the blockchain in the server. Thus, a request for remittance may be made at different timing such as at a later date.

The encryption key containing the partial data (for example, data of 30 bytes from the beginning) of the electronic currency as the data to be managed is information for recovering the body data (for example, data of 31st byte and thereafter) of the electronic currency (hereinafter referred to as "recovery information"). Specifically, assuming that the recovery information (corresponding to the encryption key containing the data of 30 bytes from the beginning) is a data string of predetermined bytes, the data can be divided into any number of pieces corresponding to the number of persons and used as tallies. Dividing the partial data as the recovery information into any number of pieces is referred to as dividing into tallies.

In an algorithm (processing procedure) for dividing into tallies, for example, to generate tallies for three persons from the recovery information, two random data strings of predetermined bytes are first generated as tallies. Then, the data strings of the two tallies are binarized. Finally, a data string of a third tally is generated so that a low-order one bit of the sum of the binarized data strings of the two tallies is recovery information. For example, when the data strings of the three tallies (tally 1, tally 2, and tally 3) are as expressed below, the first column of the data string of each tally is 1, 0, 1, the sum is 10 (binary), and the low-order one bit is 0. The second column is 1, 1, 1, the sum is 11, and the low-order one bit is 1.

| | | | | | | | | | | | | | | | | | | | | |
|---|---|---|---|---|---|---|---|---|---|---|---|---|---|---|---|---|---|---|---|---|
| tally 1 | 1 | 1 | 1 | 0 | 0 | 0 | 0 | 1 | 0 | 0 | 0 | 0 | 1 | 0 | 1 | 1 | 0 | 1 | 1 | 0 | 0 | 0 | 0 | 1 |
| tally 2 | 0 | 1 | 0 | 0 | 1 | 0 | 1 | 0 | 1 | 0 | 0 | 0 | 0 | 0 | 0 | 1 | 0 | 1 | 0 | 0 | 1 | 0 | 1 | 1 |
| tally 3 | 1 | 1 | 0 | 0 | 1 | 0 | 1 | 0 | 1 | 1 | 1 | 0 | 1 | 0 | 0 | 0 | 0 | 1 | 0 | 0 | 1 | 0 | 0 | 1 |

The three tallies can be combined in the manner described above to generate recovery information (encryption key) for recovering electronic currency as below.

| recovery | | | | | | | | | | information | | | | | | | | | |
|---|---|---|---|---|---|---|---|---|---|---|---|---|---|---|---|---|---|---|---|
| 0 | 1 | 1 | 0 | 0 | 0 | 0 | 1 | 0 | 1 | 1 | 0 | 0 | 0 | 1 | 0 | 0 | 1 | 1 | 0 | 0 | 0 | 1 | 1 |

As such, the recovery information (encryption key) is divided into tallies and managed. Thus, for example, for remittance from the bank A to the bank B, a plurality of authenticators in the central bank each have a tally, and can use the tallies to easily perform authentication of financial transactions. It is also virtually impossible to impersonate the plurality of authenticators to illegally perform financial transactions.

When electronic currency as an example of data to be managed is transferred (remitted) from the terminal of the staff of the bank A (transmitter) connected to the bank A server to a terminal of a staff of the bank B (receiver) connected to the bank B server, the staff of the bank A (transmitter) uses the terminal to log in (sign in) and access the bank A server through a public line such as the Internet. When the login using the terminal of the staff of the bank A (transmitter) is successful, the bank A server transmits a response of "login success (OK)" to the terminal and also transmits a list of electronic currency or the like.

The staff of the bank A (transmitter) selects an item required for transferring electronic currency from the list of electronic currency or the like displayed on a screen of the terminal, inputs identification information (ID) such as an address of the bank B server (colony server B) as a remittee and a user ID of the staff (receiver), and transmits a request for transmission to the bank A server.

The bank A server identifies body data of the requested electronic currency, and transmits a request containing a block hash value of the body data and the user ID of the staff of the bank B as the remittee to the central bank server. The central bank server verifies the received user ID and the block hash value. If a verification result is correct, the central bank server transmits a response (OK) of that fact and an email address of the staff of the bank B as the remittee to the bank A server. The bank A server transmits a final confirmation of whether or not to remit electronic currency to the terminal of the staff of the bank A.

When approving remittance, the staff of the bank A transmits, from the terminal, a response of approval and a final request for remittance to the bank A server. The bank A server verifies the user ID of the receiver as the remittee of the electronic currency. If no problem is found, the bank A server generates a download URL, makes a request for an email address of the staff of the bank B (receiver) as the remittee to the central bank server, and obtains the email address together with a response (OK). The bank A server emails the download URL to the obtained email address (the terminal of the staff of the bank B) (step 3). At this time, the central bank server transmits partial data containing data of 30 bytes from a beginning of the electronic currency to the bank B server. The bank B server provides notification of remittance of the electronic currency from the staff of the bank A to the terminal of the staff of the bank B as the remittee.

The staff of the bank B (receiver) checks the email on the terminal, logs in the bank A server using the download URL through a public line such as the Internet, and makes a request for download (step 4). The bank A server allows download of body data (data of 31st byte and thereafter) of the electronic currency as the data to be managed in response to the request, and the terminal of the staff of the bank B can download the body data (step 5).

The bank B server provides notification of the remittance of the electronic currency from the staff of the bank A to the terminal of the staff of the remittee. The staff of the bank B accesses the bank B server from the terminal, and the bank B server obtains an encryption key (recovery information) containing partial data of 30 bytes from the beginning of the electronic currency transmitted from the central bank server through a dedicated line (step 6). The terminal of the staff of the bank B (receiver) can download the encryption key through a public line such as the Internet (step 7). Then, the terminal of the staff of the bank B couples the partial data contained in the encryption key and the body data to recover the electronic currency. Thus, the remittance from the bank A to the bank B is completed.

As such, the staff of the bank B receives any notification such as an email, logs in the bank B server as a colony server, and obtains the encryption key containing the partial data of the electronic currency, and thus can recover (decode) the electronic currency without the partial data to complete electronic currency. In this case, the bank B server does not perform recovery processing, but can receive a request for recovery processing on a Web browser of the terminal of the staff of the bank B, and perform the recovery processing on the terminal. In this scheme of the data management system according to the embodiment of the present invention, no temporary entity is generated on the colony server (bank B server), thereby preventing unauthorized access. Since a slight cache remains on each server, the data management system may be configured to appropriately delete data in accordance with a transaction process.

Figure 13:
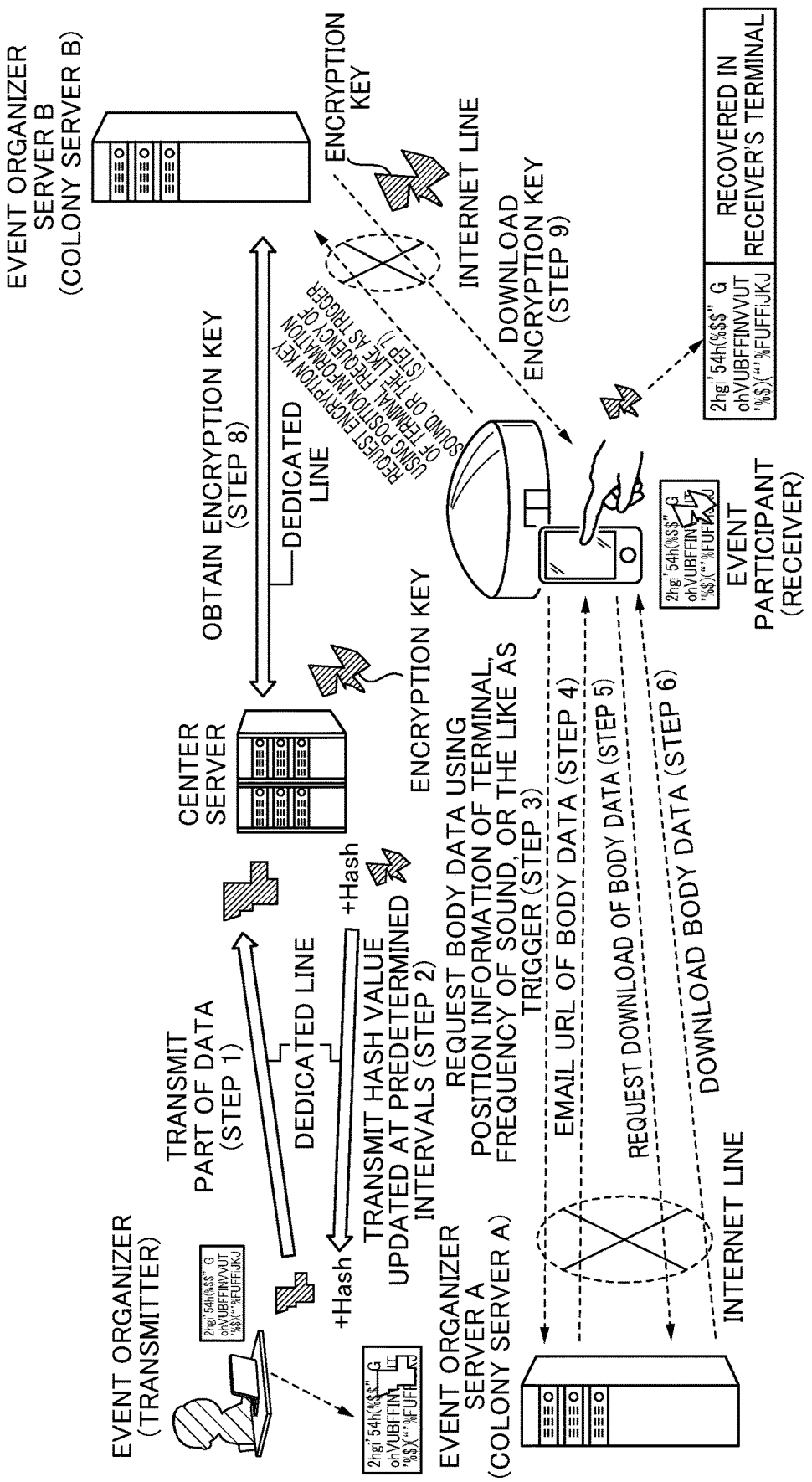
FIG. 13 shows an example of the data management system according to the present invention applied to bonus offering to an event participant.

FIG. 13 shows an example of the data management system according to the present invention applied to bonus offering to an event participant. The system of the present invention may be applied to an event in which bonuses such as coupons or points are offered to participants going to predetermined locations. For example, the system may be applied to an event such as a stamp rally in which participants take a train and get off at predetermined stations to obtain bonuses such as stamps of characters. The system may be also applied to a system in which, in accordance with crowdedness of train cars, passengers are guided from crowded cars to uncrowded cars and bonuses are offered to passengers who have actually moved from the crowded cars to the uncrowded cars. The system of the present invention may be further applied to a mechanism in which bonuses are offered to participants vising predetermined event sites and bonuses are offered to participants going to specific locations directed in the event sites.

For example, a mobile terminal such as a smartphone of a receiver of electronic data corresponding to a bonus (hereinafter referred to as "bonus data") can capture sound with a microphone or the like, and in response to a specific frequency of sound, transmit a request for bonus offering from the mobile terminal to a colony server, and obtain bonus data. If a specific location can be identified, GPS information on the mobile terminal may be used instead of capturing sound with a microphone or the like.

In an example of the system applied to train congestion relief, notification can be provided to mobile terminals of passengers on a train to cause the passengers to obtain bonus data through the mobile terminals in response to specific sound (frequency of sound) of announcement or the like in the train, thereby promoting the passengers to obtain bonus data. To cause the passengers to move from crowded train cars to uncrowded cars, such a bonus offering mechanism can produce specific sound such as announcement to allow obtaining bonus data in the uncrowded cars, thereby promoting movement of the passengers.

Also, specific sound such as announcement or advertisement to allow obtaining bonus data may be produced in specific locations in event sites to cause movement of event participants. With reference to FIG. 13, when this system is applied to an event, an event organizer (transmitter) uses a terminal connected to an event organizer server A (colony server A) to log in and access the event organizer server A through a public line such as the Internet. When the login using the terminal of the event organizer is successful, the event organizer server A transmits a response of "login success (OK)" to the terminal. Then, the event organizer selects, on the terminal, upload of bonus data as an example of data to be managed or request for generation of the bonus data, and uploads the bonus data to the event organizer server A or transmits a request for generation of the bonus data. The event organizer server A performs encryption of the uploaded or generated bonus data, such as compression or conversion into a character string. For example, the event organizer server A divides the bonus data into partial data of 30 bytes from a beginning and body data of 31st byte and thereafter, and transmits the partial data of 30 bytes from the beginning through a dedicated line (closed network) to a center server (step 1).

The center server generates one block to add the partial data of 30 bytes from the beginning to a blockchain, encrypts the partial data of 30 bytes from the beginning and at least one of time (for example, an upload date and time or a creation date and time) related to bonus data as data to be managed and a filename corresponding to the bonus data as the data to be managed, and generates an encryption key containing the partial data and at least one of the filename and the time (for example, an upload date and time or a creation date and time). The center server adds the generated block containing the encryption key to the blockchain, and transmits a block hash value ("+Hash" in FIG. 13) of the added block to the event organizer server A (step 2). The block hash value is updated at predetermined intervals by the center server and transmitted to the event organizer server A.

The event organizer server A stores the received block hash value together with the body data in a database, and generates bonus data without the partial data (that is, body data). Finally, when completing registration (generation) of the bonus data, the event organizer server A transmits completion notification to the terminal of the event organizer. When registered in the center server, the bonus data is registered to be permanently managed in the blockchain in the server. Thus, a request for bonus offering may be made at different timing such as at a later date.

When bonus data is transferred (bonus is offered) from the terminal of the event organizer connected to the event organizer server A to a terminal of an event participant (receiver) connected to an event organizer server B (colony server B), a request for an encryption key containing body data and partial data of the bonus data can be made to each server (event organizer servers A and B) for bonus offering in response to a movement of a mobile terminal of the event participant to a predetermined location, that is, using the movement to the predetermined location as a trigger (steps 3 to step 7).

An example of an event is a stamp rally in which a participant takes a train to collect stamps placed at predetermined stations. To allow the event participant to take a train and get off at predetermined stations to obtain bonuses such as electronic stamps of characters or points, a request for bonus offering can be transmitted to each server (event organizer servers A and B) using, as a trigger, a mobile terminal of the event participant having moved to a position substantially matching position information on a get-off station or a microphone or the like of the mobile terminal collecting sound of a specific frequency such as announcement in the get-off station.

The system may be applied to not only such an event but also train congestion relief in the same manner. For example, to promote passengers to move from crowded train cars to uncrowded cars, the event organizer server A (or the event organizer server B) can provide notification, to passenger's mobile terminals, that bonuses are offered to passengers moving to specific cars (uncrowded cars). In the uncrowded cars, sound of a specific frequency such as announcement to allow obtaining bonus data is produced, and when passengers move to the uncrowded cars, a request for bonus offering can be transmitted to each server (event organizer servers A and B) using, as a trigger, microphones of the passenger's mobile terminals collecting the specific frequency.

As shown in FIG. 13, in the steps (steps 3 to 7) of bonus offering to an event participant, a request for body data of bonus data is made using, as a trigger, the event participant moving to a designated location (for example, event site) and position information, from the GPS or the like, on a mobile terminal of the event participant indicating that location, or sound from a speaker or the like at the designated location being collected by a microphone or the like of the mobile terminal and a specific frequency of the collected sound (step 3). The event organizer server A verifies a user ID of the event participant (receiver) as a destination of the bonus data. If no problem is found, the event organizer server A generates a download URL, makes a request for an email address of the event participants (receiver) as the destination to the center server, and obtains the email address together with a response (OK). The event organizer server A emails the download URL to the obtained email address (the terminal of the event participant) (step 4). At this time, the center server transmits partial data containing data of 30 bytes from a beginning of the bonus data to the event organizer server B. The event organizer server B provides notification of bonus offering from the event organizer to the mobile terminal of the event participant as the destination.

The event participant (receiver) checks the email on the mobile terminal, logs in the event organizer server A using the download URL through a public line such as the Internet, and makes a request for download (step 5). The event organizer server A allows download of body data (data of 31st byte and thereafter) of the bonus data as the data to be managed in response to the request, and the mobile terminal of the event participant can download the body data (step 6).

The event organizer server B provides notification of the bonus offering from the event organizer to the mobile terminal of the event participant as the destination. The event participant accesses the event organizer server B from the mobile terminal, and the event organizer server B obtains an encryption key (recovery information) containing partial data of 30 bytes from the beginning of the bonus data transmitted from the center server through a dedicated line (step 8). The mobile terminal of the event participant can download the encryption key through a public line such as the Internet (step 9). Then, the mobile terminal of the event participant couples the partial data contained in the encryption key and the body data to recover the bonus data, thereby offering a bonus to the event participant. Thus, the bonus offering from the event organizer to the event is completed.

As such, the event participant receives any notification such as an email, logs in the event organizer server B as a colony server, and obtains the encryption key containing the partial data of the bonus data, and thus can recover (decode) the bonus data without the partial data to complete bonus data. In this case, the event organizer server B does not perform recovery processing, but can receive a request for recovery processing on a Web browser of the event participant, and perform the recovery processing on the mobile terminal. In this scheme of the data management system according to the embodiment of the present invention, no temporary entity is generated on the colony server (event organizer server B), thereby preventing unauthorized access. Since a slight cache remains on each server, the data management system may be configured to appropriately delete data in accordance with a transaction process.

In the embodiment in FIG. 13, the method of transfer of data to be managed using two colony servers connected to a center server in FIGS. 10 and 11 (the case of different colonies) is applied to bonus offering to an event participant. However, not limited to this, the method of transfer of data to be managed using one colony server connected to a center server in FIG. 9 (the case of own colony) may be applied.

The data management system of the present invention is not limited to the embodiments in FIGS. 12 and 13, but may be used for transmission of electronic data of copyrighted material such as music, movies, and books, and applied as a platform for distribution of movies and music.

As described above, in the data management system according to the embodiment of the present invention in FIG. 1, the communication between the colony server 20 and the information processing terminal 30 uses an open network such as the Internet. A rapid increase in the number of radio stations for mobile phones or the like and speedup of wireless communication increase demand for frequencies, and a communication volume of mobile phones is expected to further increase. For this reason, it is necessary to allocate radio waves and reorganize frequencies to relieve a tight frequency situation and accurately meet new demand for frequencies. Fifth-generation mobile communications system (5G), which can be one of measures, has ultra-high speed, low latency, multiple connections, and the like as system requirements, and research and development to realize thereof is underway in countries around the world. In particular, unlike conventional mobile communication systems, 5G is expected to be an infrastructure for IoT, and it is expected that an enormous number of terminals will be connected to base stations and a wide variety of services will be provided.

Under such circumstances, the present invention can contribute to effective use of radio waves (frequencies) by mobile phones or the like in communication based on the fifth-generation mobile communication system (5G). For example, as in the embodiments in FIGS. 12 and 13, the data management system of the present invention divides data to be managed into partial data and body data, the center server manages an encryption key containing the encrypted partial data, and the colony server manages the body data. Communication between the colony server and the information processing terminal can be performed through the Internet line using 5G. The encryption key containing the partial data is of a small size (for example, 30 bytes from a beginning of the data to be managed) and does not tighten a communication line. If the body data of a large size that may tighten the communication line does not need to be transmitted in a hurry to the information processing terminal as a destination, the body data may be automatically downloaded from the colony server when the communication line is free. Thus, the present invention can contribute to effective use of radio waves (frequencies).

Figure 14:
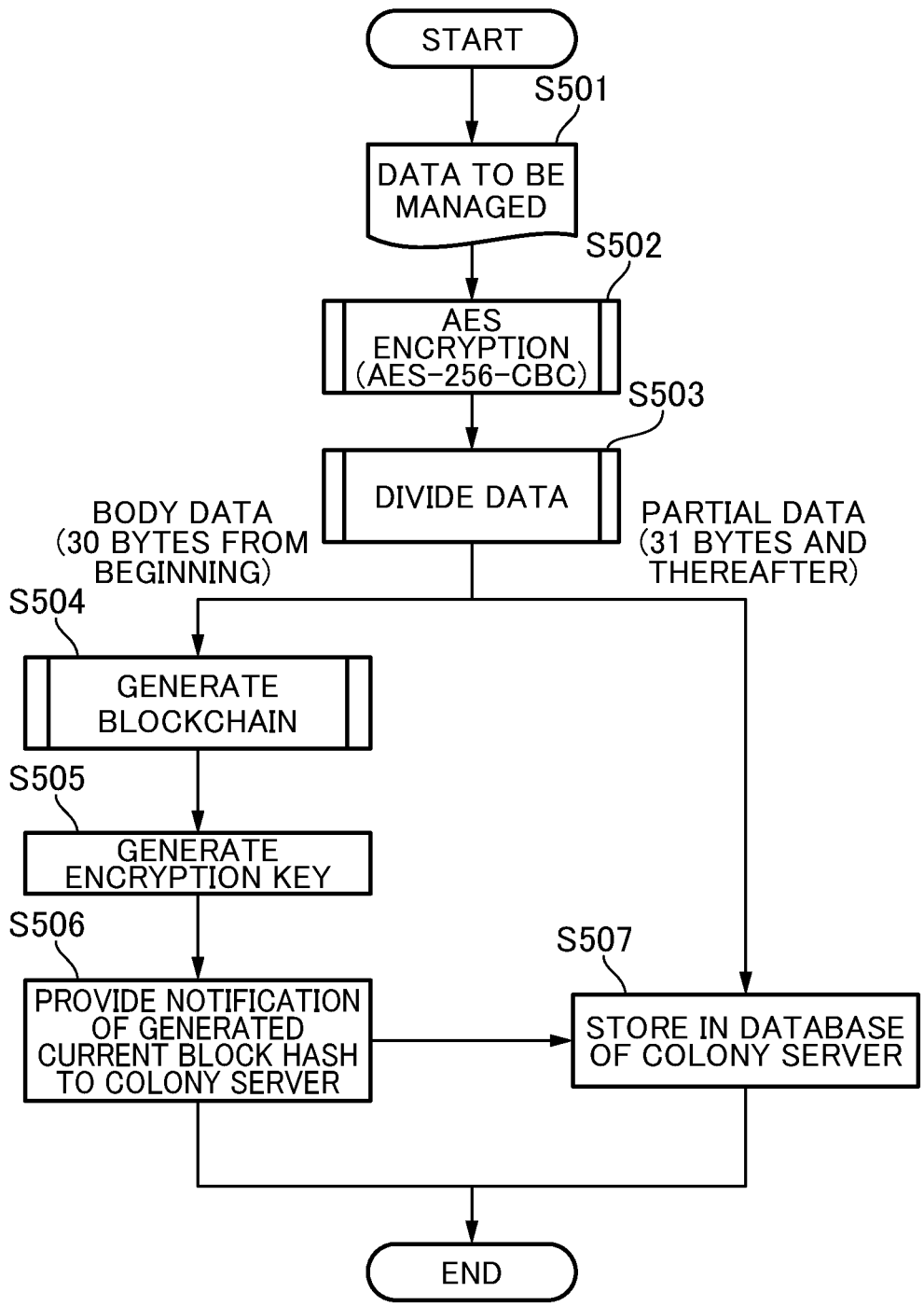
FIG. 14 is a flowchart of processing for dividing data to be managed into an encryption key and body data in the entire data management system.

FIG. 14 is a flowchart of processing for dividing data to be managed into an encryption key and body data in the entire data management system. When handling electronic data such as secret information, electronic exchange, additional telegraphic messages, cryptocurrency, virtual currency, electronic currency, or valuable securities, the information processing terminal 30 uploads the electronic data as data to be managed to the colony server 20 (step S501), and the colony server 20 encrypts the data to be managed (step S502). For example, AES encryption (AES-256-CBC) can be used. The data to be managed may be encrypted by a method using compression or MIME as shown in FIGS. 4 and 5, or other encryption methods.

The colony server 20 divides the encrypted data to be managed into partial data of a predetermined size and body data containing data of a remaining part other than the partial data (step S503). For example, the partial data may contain data of 30 bytes from a beginning of the encrypted data to be managed and the body data may contain data of 31st byte and thereafter to an end, but not limited thereto.

Figure 15:
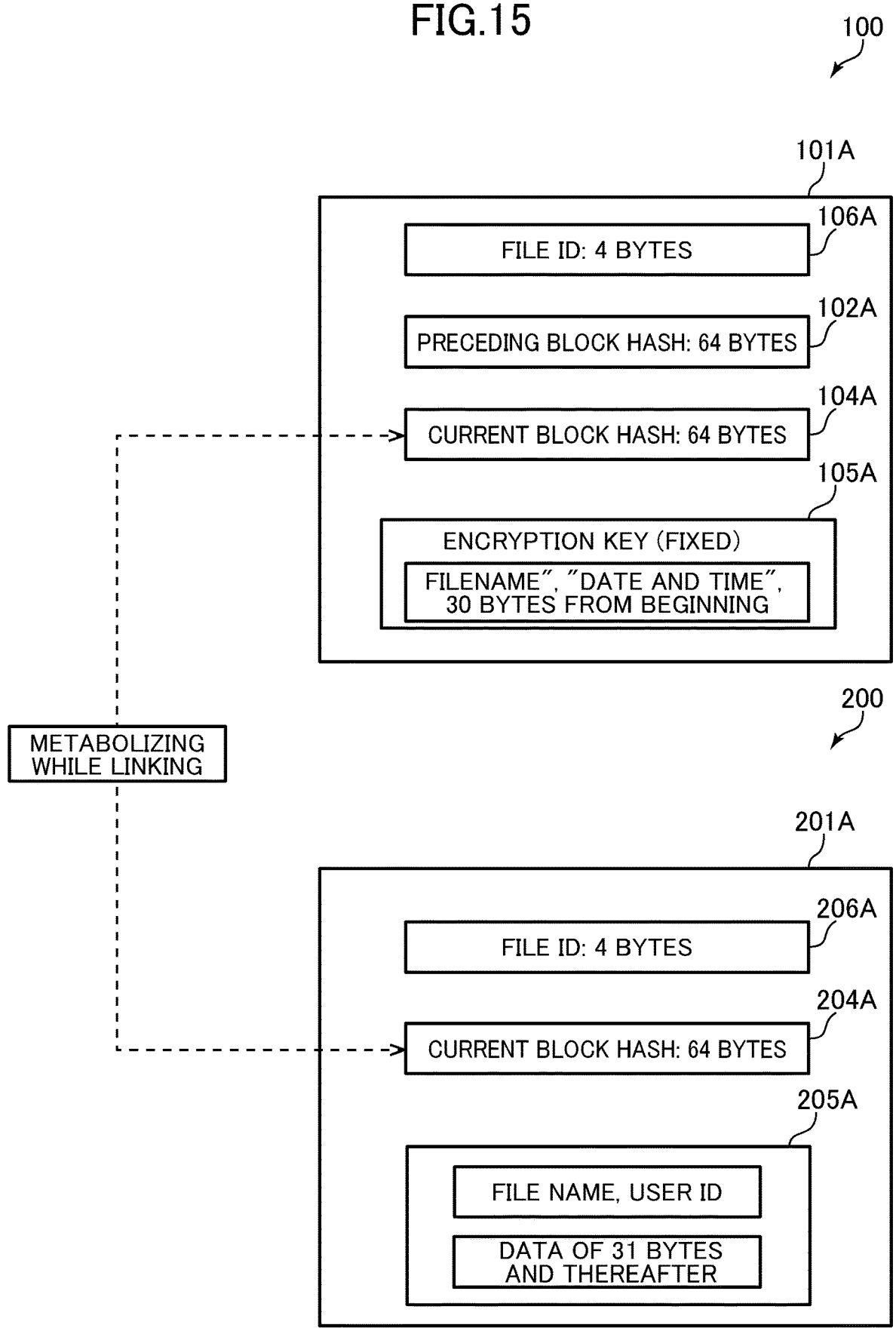
FIG. 15 shows a relationship between one block in the blockchain accessible by the center server and body data accessible by the colony server.
Figure 16:
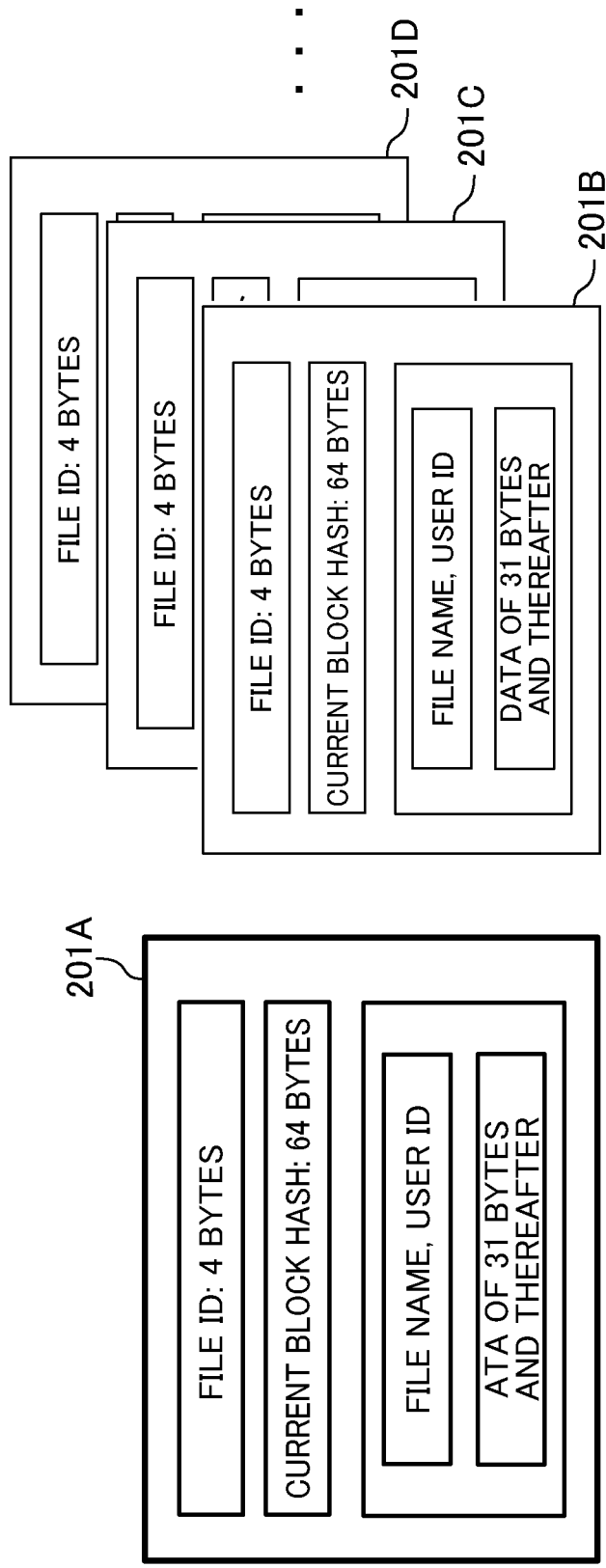
FIG. 16 shows an outline of the body data independently stored in the colony server.

The center server 10 generates one block in a blockchain for storing the partial data (for example, the data of 30 bytes from the beginning) (step S504), generates an encryption key containing the partial data (step S505), and provides notification of a generated current block hash value to the colony server 20 (step S506). The colony server 20 stores the hash value in the database (hash information storage unit 271) (step S507). FIGS. 15 and 16 show details of the blockchain containing the partial data generated in the data management system and the body data.

FIG. 15 shows a relationship between one block in the blockchain accessible by the center server and the body data accessible by the colony server. FIG. 16 shows an outline of the body data independently stored in the colony server. FIG. 15 more specifically shows the outline of the blockchain 100 shown in FIG. 6. One block 101A in the blockchain 100 stored in a database (encryption key storage unit 173) of the center server 10 contains at least, for example, a hash value 102A of a preceding block, a hash value 104A of a current block, and an encryption key 105A. The hash values 102A and 104A may be, for example, data of 64 bytes. The hash value 104A of the current block is updated to a new hash value at predetermined intervals by the center server 10. The encryption key 105 is fixed data without being updated. The encryption key 105A is encrypted data containing, for example, a filename of data to be managed, a date and time of a transaction or file creation, and data of 30 bytes from a beginning. The block 101A can contain a file ID of 4 bytes as information for identifying the block 101A.

With reference to FIGS. 15 and 16, the database (body data storage unit 272) of the colony server 20 stores a data block group 200. A plurality of data blocks 201A to 201D contained in the data block group 200 do not constitute the blockchain but are stored independently of each other.

The one data block 201A contains at least, for example, a hash value 204A of a current block and body data 205A. The hash value 204A may be data of, for example, 64 bytes. The body data 205A is, for example, data of 31 bytes and thereafter of the data to be managed, and can contain a filename of the data to be managed and a user's user ID as required. The data block 201A can contain a file ID of 4 bytes as information for identifying the data block 201A.

The center server 10 updates the hash value 104A of the current block at predetermined intervals and provides notification to the colony server 20. The predetermined interval may be 24 hours or shorter such as 1 hour, 2 hours, 3 hours, 4 hours, 5 hours, or 6 hours, or may be 24 hours or longer. The colony server 20 receives the notification from the center server 10, and updates the hash value 204A to the same value as the hash value 104A. Thus, it looks as if the hash value 104A of the block containing the encryption key 105A and the hash value 204A of the block containing the body data 205A are updated in a linking manner in the blockchain. Such an operation is also referred to as "metabolizing" in the present invention. Specifically, update of the hash value 104A and the hash value 204A at predetermined intervals is referred to as "metabolizing while linking."

As such, with the data management system according to the present invention, the data to be managed is managed in a divided manner into the partial data and the body data, the hash value of the partial data stored as the encryption key in one block in the blockchain 100 managed by the center server 10 is updated at predetermined intervals, and the hash value of the body data in the colony server 20 is updated to the same value as that of the partial data (that is, metabolizing while linking). Then, even if the body data is leaked from the colony server 20 through unauthorized access or the like, the hash value of the encryption key containing the partial data paired with the unauthorizedly leaked body data is updated at predetermined intervals, and thus an encryption key containing a hash value matching the hash value of the body data no longer exists. Thus, an encryption key necessary for recovering the data to be managed cannot be reached by analyzing the unauthorizedly leaked body data, thereby substantially precluding recovery of the data to be managed.

The data management system according to the embodiment of the present invention can handle, as data to be managed, electronic data such as secret information, electronic exchange, additional telegraphic messages, cryptocurrency, virtual currency, electronic currency, or valuable securities, and contents of electronic data to be handled are not substantially limited. The transmitter of the data management system according to the present invention can transmit data of as unlimited type and size as possible, and the center server can manage data of which a capacity is made as small as possible. Also, the data to be transmitted is divided into body data (partially missing data) and partial data (missing part), which are transmitted and received through different networks. The body data (data to be managed other than the partial data) is transmitted and received through a public line such as the Internet, and even if the body data is hacked, the body data is partially missing data, and thus no actual damage occurs. On the other hand, the receiver of the data management system according to the present invention can receive an encryption key containing the partial data of which a capacity is made as small as possible, previously download the body data to be received, and use the encryption key received through a network different from the network for the body data to recover the data to be managed from the body data on the terminal. Thus, even if the body data or the encryption key containing the partial data is separately hacked during being transmitted or received, no actual damage occurs.

Figure 17:
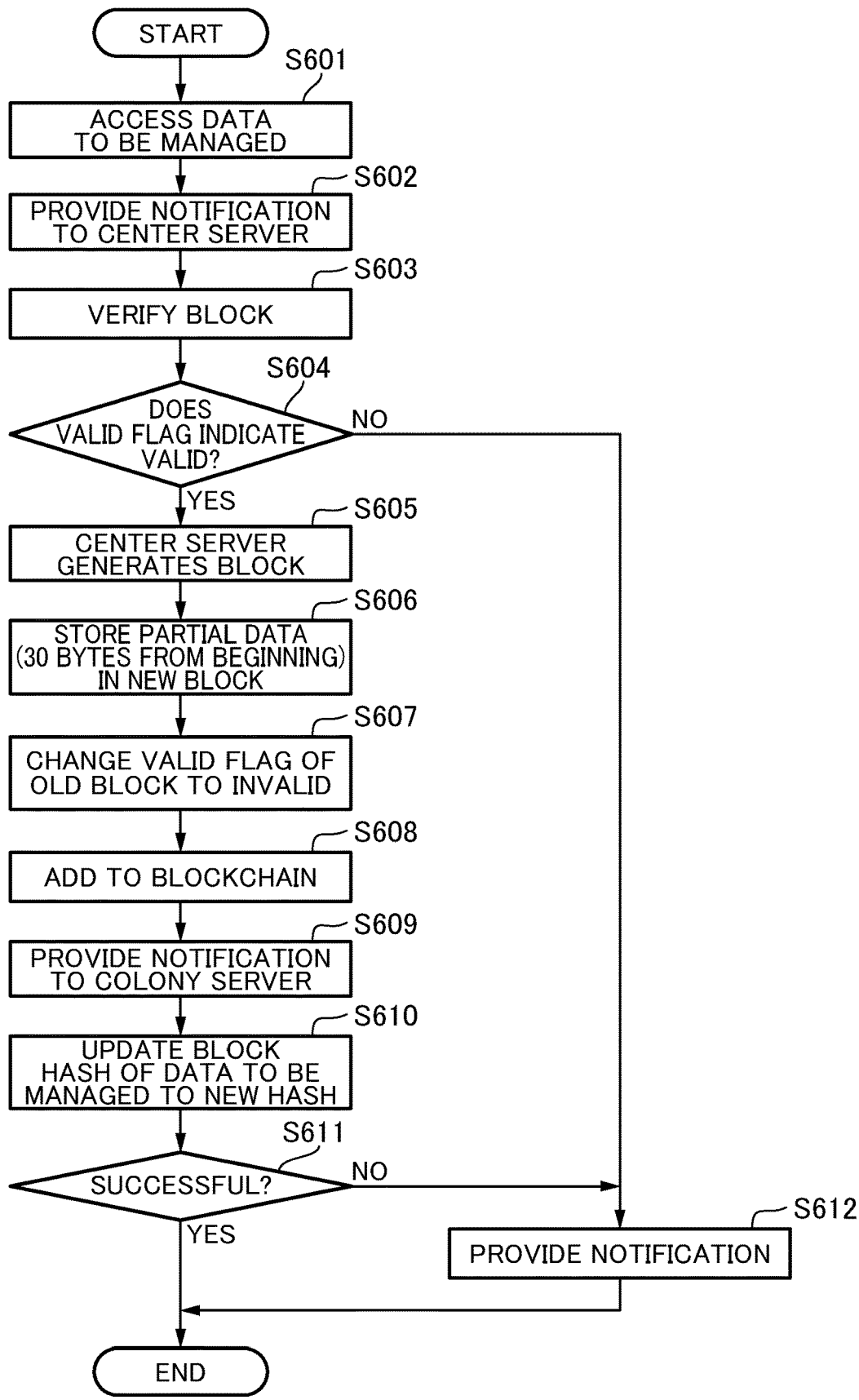
FIG. 17 is a flowchart of processing for the center server connecting a new block containing an encryption key to the blockchain.

FIG. 17 is a flowchart of processing for the center server connecting a new block containing an encryption key to the blockchain. The flowchart in FIG. 17 corresponds to processing for the information processing terminal 30 registering electronic currency data as an example of data to be managed through the colony server 20 in the center server 10, for example, as shown in FIG. 7.

When the information processing terminal 30 or the like accesses data to be managed including registration or generation of the data to be managed (step S601), the colony server 20 provides notification of that fact to the center server 10 (step S602), and the center server 10 verifies a block in the blockchain 100 (step S602). The center server 10 stores, in association with each of a plurality of blocks in the blockchain 100, a valid flag indicating that each block is valid or invalid. The center server 10 checks a valid flag corresponding to a current block (for example, a last block) in the blockchain 100 (step S604). If the valid flag indicates invalid (No in step S604), the center server 10 provides notification such as an error message (step S612).

If the valid flag corresponding to the current block (last block) in the blockchain 100 indicates valid (for example, YES in step S604), the center server 10 generates a block to be newly added to the blockchain 100 (step S605). Then, to connect the newly generated block (new block) to the blockchain 100, the center server 10 stores partial data (for example, 30 bytes from a beginning) of the data to be managed in the new block (step S606). Further, the center server 10 changes a valid flag, which has indicated valid, of a block (old block) to invalid (step S607), and adds the new block to the blockchain 100 (step S608). Specifically, the new block is connected to the old block in the blockchain 100.

Then, the center server 10 provides notification of completion of addition of the partial data (for example, data of 30 bytes from the beginning) of the data to be managed and a block hash value of the new block to the colony server 20 (step S609). The colony server 20 updates a hash value of body data (for example, data of 31 bytes and thereafter) of the data to be managed to the hash value of the new block notified by the center server 10 (step S610). The colony server 20 checks whether or not registration of the electronic currency in the center server 10 is successful (step S610). If the registration is successful (YES in step S611), the colony server 20 finishes the processing. If the registration is unsuccessful (No in step S611), the colony server 20 provides notification such as an error message (step S612).

FIG. 18 shows a configuration of the blockchain managed by the center server. One block 101A in the blockchain 100 basically has the same configuration as in FIG. 17, and contains a hash value 102A of a preceding block, a hash value 104A of a current block, and an encryption key 105A. The same applies to other blocks 101B, 101C. The blocks 101A, 101B, 101C contain nonces 103A, 103B, 103C, respectively, which can be used, for example, for calculation of a hash value to connect a subsequent block by the same method as Proof of Work. When the data management system includes one center server 10, there is no need to use a nonce because verification of the blockchain can be omitted. When the data management system includes a plurality of center servers 10, and the blockchain 100 is managed by the plurality of center servers 10 in another embodiment of the present invention, however, nonces can be used in each center server 10 to verify the blockchain and add a new block.

In the blockchain 100, the block 101A and the block 101B are coupled because the hash value 104A is the same as the hash value 102B, and the block 101B and the block 101C are coupled because the hash value 104B is the same as the hash value 102C.

FIG. 19 shows an outline of various types of information stored in the database of the center server. For example, as shown in FIG. 2, the center server 10 includes, as the databases, the colony information storage unit 171 for storing colony information, the user information storage unit 172 for storing user information, and the encryption key storage unit 173 for storing the blockchain 100 as shown in FIG. 18. The colony information in FIG. 19(a) is stored, for example, in the colony information storage unit 171. The colony information includes, for example, a colony server ID of one or more colony servers 20 connected to the center server 10, a user ID of a user who logs in the colony server 20 from the information processing terminal 30, and a valid flag indicating whether both the colony server ID and the user ID are valid (TRUE) or either one is invalid (FALSE). For example, the center server 10 can identify a valid colony server ID and a valid user ID in accordance with the valid flag with reference to the colony information stored in the colony information storage unit 171.

The user information in FIG. 19(b) is stored, for example, in the user information storage unit 172. The user information includes, for example, a user ID and an email address of a user of the data management system according to the present invention, and a valid flag indicating whether both the user ID and the email address are valid (TRUE) or either one is invalid (FALSE). For example, the center server 10 can identify a valid user ID and a valid email address in accordance with the valid flag with reference to the user information stored in the user information storage unit 172. In this embodiment, the colony information stored in the colony information storage unit 171 and the user information stored in the user information storage unit 172 are stored as separate data independently of data related to the blockchain 100 stored in the encryption key storage unit 173.

FIG. 20 shows an outline of information stored in the database of the colony server. For example, as shown in FIG. 3, the colony server 20 includes, as the databases, the hash information storage unit 271 for storing hash information, and the body data storage unit 272 for storing the data block group 200 of body data as shown in FIG. 16. The hash information in FIG. 20 is stored, for example, in the hash information storage unit 271. The hash information includes, for example, a user ID, a block hash (for example, data of 64 bytes) of a data block that stores body data, a transaction date and time (year/month/date/hour:minute:second (YYYY/MM/DD/HH:MM:SS)) of data to be managed, and a valid flag indicating whether at least a block hash value is valid (TRUE) or invalid (FALSE). For example, the colony server 20 can determine whether or not the hash value is valid in accordance with the valid flag with reference to the hash information stored in the hash information storage unit 271.

Figure 21:
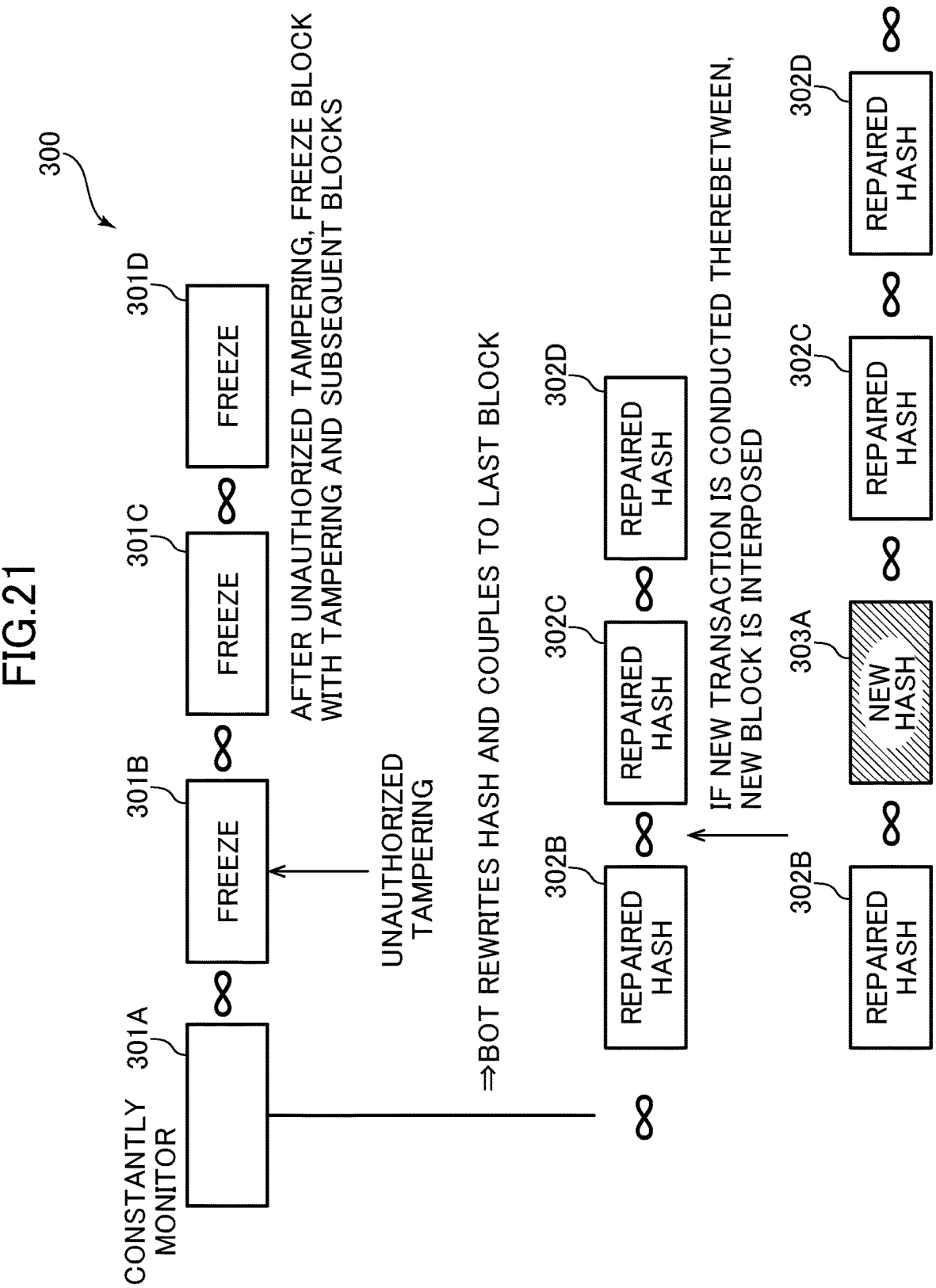
FIG. 21 shows an outline of processing for freezing and repairing blocks when tampering is detected in the blockchain.

The center server 10 can include a monitor bot for monitoring tampering of the blockchain, and a repair bot for repairing the blockchain. The bot means an application or a program for automating a certain task or processing. FIG. 21 illustratively shows an outline of processing of the monitor bot and the repair bot for a blockchain 300 including a plurality of coupled blocks 301A to 301D. Specifically, FIG. 21 shows an outline of processing for freezing and repairing the blocks when tampering is detected in the blockchain. The blockchain 300 shown as an example of a blockchain in FIG. 21 basically has the same structure as the blockchain 100 in FIG. 18.

The monitor bot can constantly monitor the blockchain 300 managed by the center server 10. For example, when the monitor bot finds tampering (unauthorized alteration or the like) in the block 301B in the blockchain 300, the center server 10 or the monitor bot invalidates, for example, a flag corresponding to the block 301B to invalidate the block 301B, and similarly invalidates the subsequent blocks, that is, the block 301C coupled to the block 301B and the block 301D coupled to the block 301C. Invalidating a block in this manner is herein also referred to as freezing a block.

After the monitor bot freezes the block with the unauthorized tampering and the subsequent blocks in response to finding the unauthorized tampering, the repair bot repairs the blockchain 300. The repair bot repairs the blocks to recover the block 301B with the tampering and the subsequent blocks in accordance with a correct transaction record with reference to a book database (not shown) managed independently of the blockchain 300 managed by the center server 10. For example, when the center server 10 is operated in a financial institution such as a bank, a book database of a server completely independent of the center server 10 stores a transaction record of data to be managed. The repair bot can recover the blockchain 300 managed by the center server 10 with reference to the book database.

In the example of repair in FIG. 21, the repair bot generates a block 302B repaired with reference to the book database, rewrites a hash value of the block 301A to equalize a hash value of the block 302B with the hash value of the block 301A, and thus couples the block 302B to the block 301A. Similarly, the repair bot generates a block 302C repaired with reference to the book database, equalizes a hash value of the block 302C with the hash value of the block 302B, and thus couples the block 302C to the block 302B. The same applies to the block 302D.

If a new transaction is conducted during the repair by the repair bot, for example, if a new transaction is conducted after the repair of the block 302B, a new block 303A is interposed between the block 302B and the block 302C. Specifically, after the repair of the block 302B, the block 303A storing a new transaction record is generated, and a hash value of the block 303A is equalized with the hash value of the repaired block 302B, and thus the block 303A is coupled to the block 302B. Similarly, the block 302C is coupled to the block 303A, and the block 302D is coupled to the block 302C.

Figure 22:
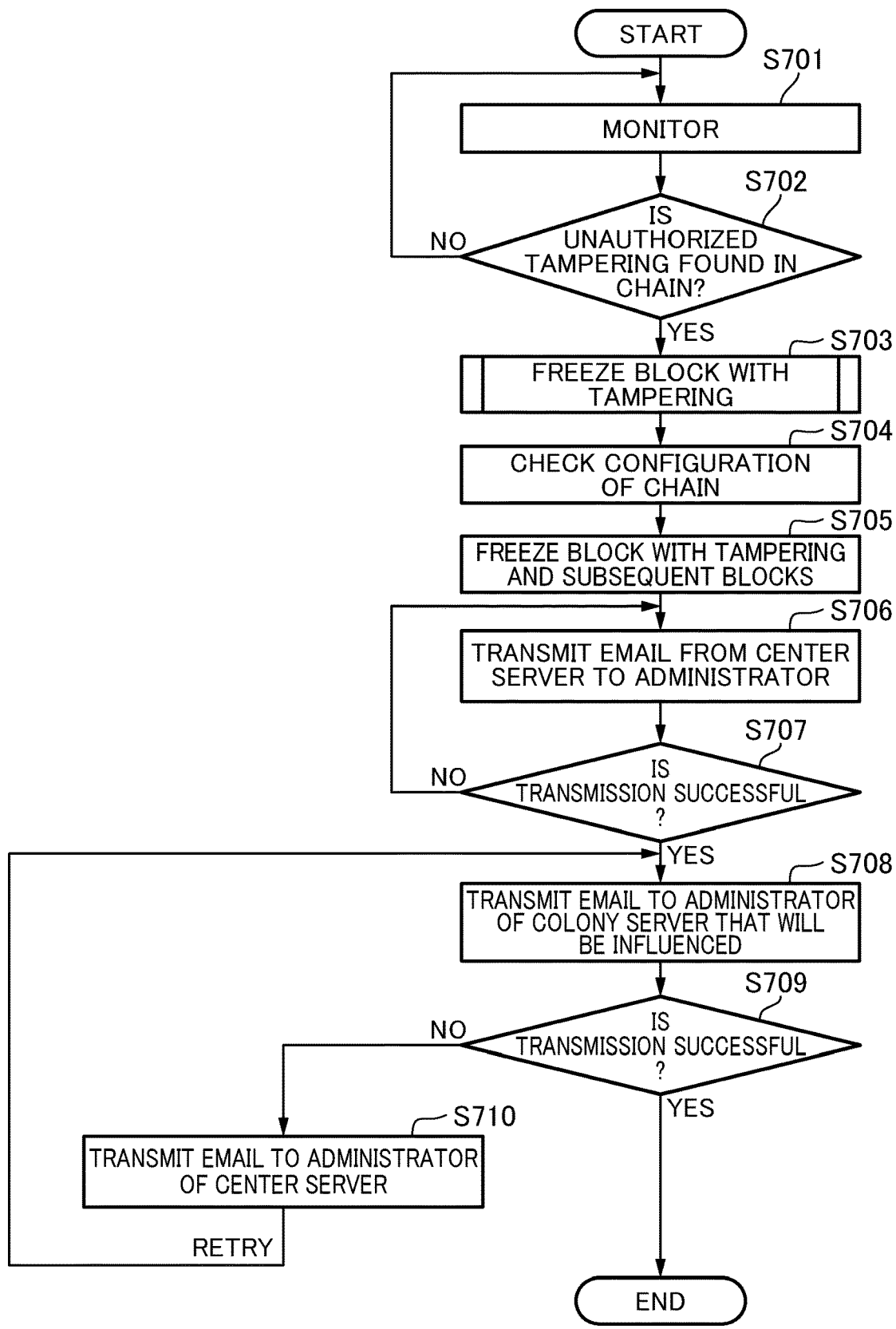
FIG. 22 is a flowchart of processing when the blockchain is monitored to detect tampering.

FIG. 22 is a flowchart of processing when the blockchain is monitored to detect tampering. The monitor bot at least temporarily resides in, for example, the center server 10 to constantly monitor the blockchain (for example, blockchain 100) (step S701). The monitor bot monitors and checks whether or not tampering (unauthorized alteration or the like) is found in a block in the blockchain (step S702). If no tampering is found (NO in step S702), the monitor bot continues monitoring (step S701). If tampering is found (YES in step S702), as shown in FIG. 21, the monitor bot or the center server 10 freezes a block with the unauthorized tampering (step S703). Then, after checking a configuration of the blockchain (step S704), the monitor bot or the center server 10 similarly freezes a block coupled to the block with the tampering and subsequent blocks (step S705).

After freezing the blocks with the tampering in the blockchain, the center server 10 transmits an email to an administrator (step S706), and checks whether or not email transmission is successful (step S707). If the email transmission is unsuccessful (NO in step S707), the center server 10 again transmits the email (step S706). If the email transmission is successful (YES in step S707), the center server 10 transmits an email to an administrator of each colony server 20 that will be influenced by freezing of the blockchain (step S708).

The center server 10 checks whether or not the email transmission to the administrator of the colony server 20 is successful (step S709). If the email transmission is successful (YES in step S709), the center server 10 finishes the processing. If the email transmission is unsuccessful (NO in step S709), the center server 10 transmits an email to the administrator of the center server 10 to provide notification of that fact (step S710), and retries to transmit the email to the administrator of the colony server for which the email transmission was unsuccessful (step S708).

Figure 23:
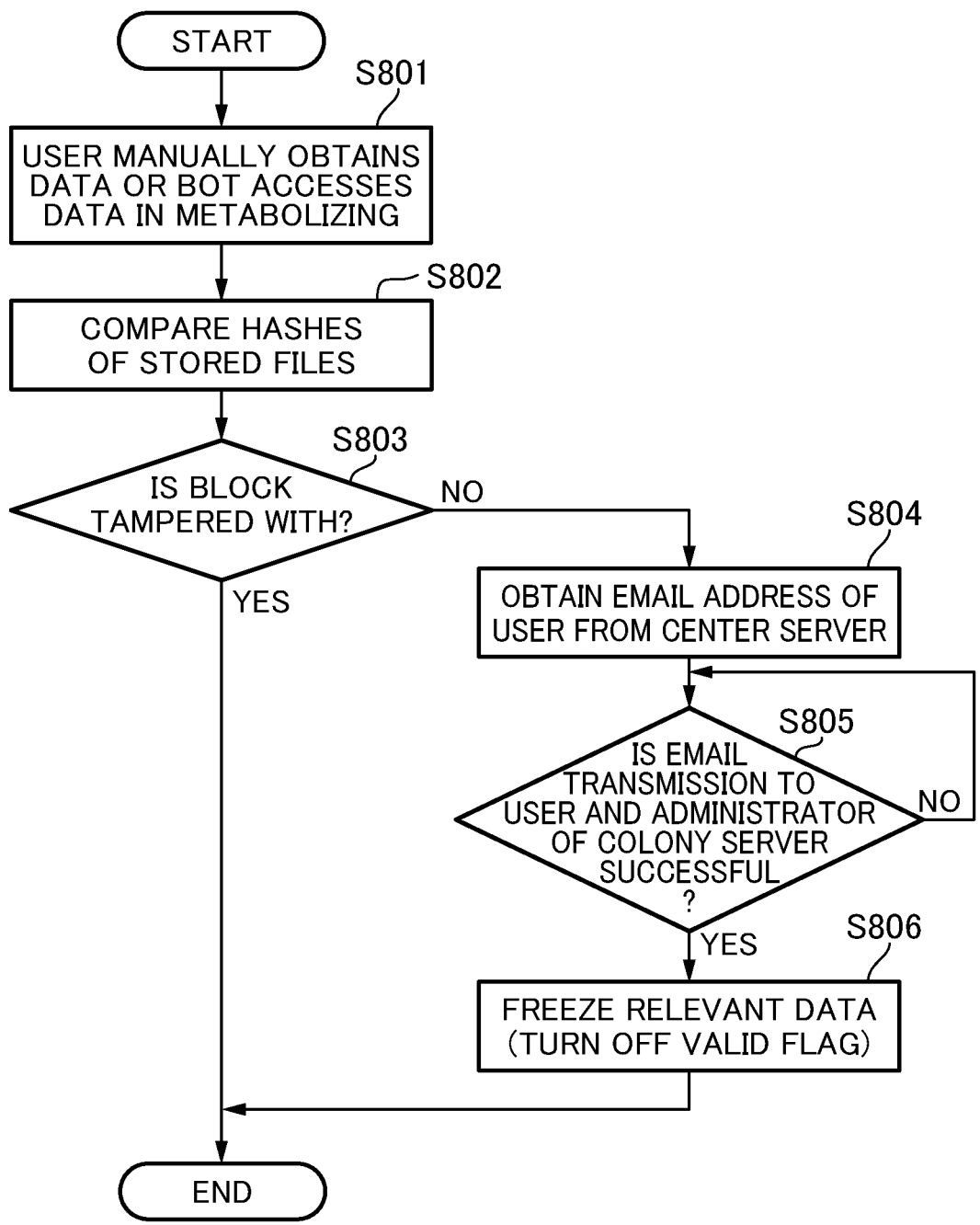
FIG. 23 is a flowchart of processing for freezing a block in the blockchain.

FIG. 23 is a flowchart of processing for freezing a block in the blockchain. FIG. 23 shows an embodiment different from that in the flowchart in FIG. 22. A user manually obtains data corresponding to a block in the blockchain, or a bot accesses data corresponding to a block in the blockchain in metabolizing (processing for providing notification of updated hash value) (step S801). Hash values of stored files corresponding to the data are compared (step S802), and whether or not the block is tampered with (step S803) is checked. If the block is not tampered with (NO in step S803), the processing is normally finished. If the block is tampered with (YES in step S803), an email address of the user (and an administrator) is obtained from the center server 10 (step S804), emails are transmitted to the user and an administrator of a colony server, and whether or not email transmission is successful is checked (step S805). If the email transmission is successful (YES in step S805), relevant data is frozen (specifically, a flag indicating valid or invalid related to the data is turned off to indicate that the data is invalid) (step S806). If the email transmission is unsuccessful (NO in step S805), the email is again transmitted to check a state of the email transmission (step S805).

Figure 24:
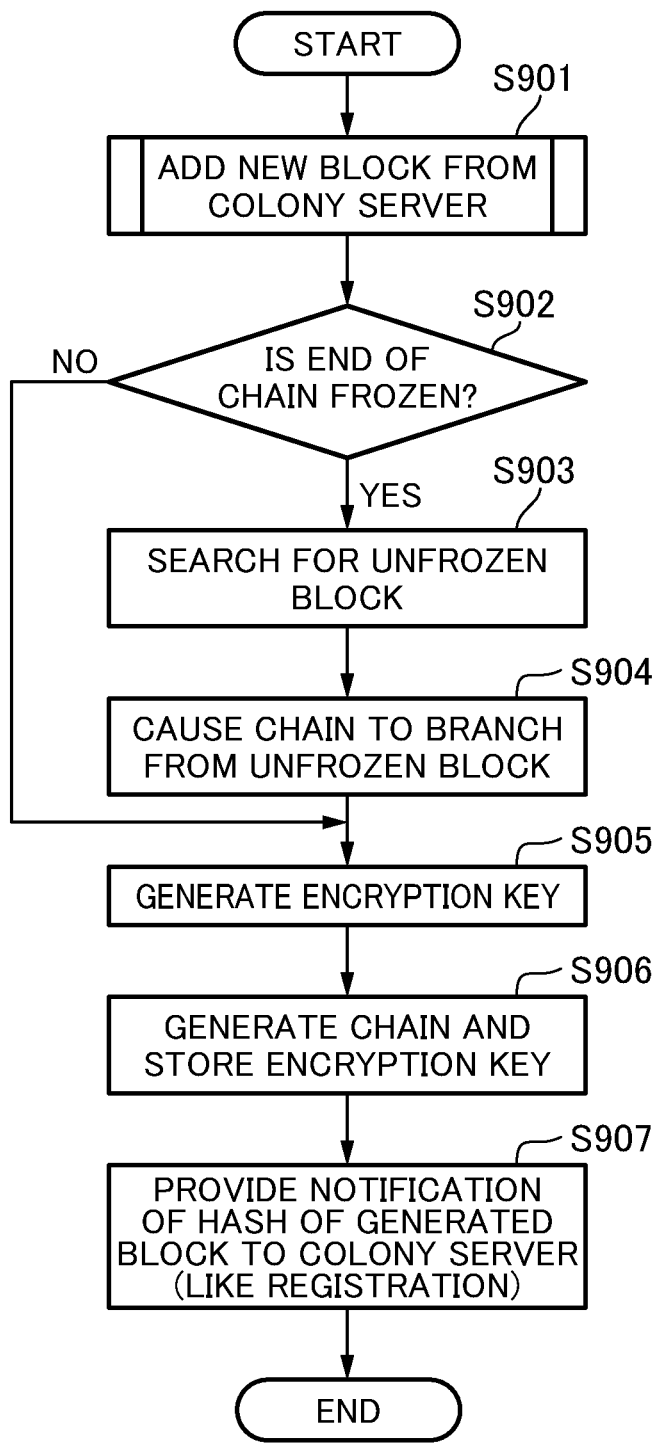
FIG. 24 is a flowchart of processing for repairing the blockchain.

FIG. 24 is a flowchart of processing for repairing the blockchain. After the freezing of the blockchain, the center server 10 receives, from the colony server 20, partial data of data to be managed and an instruction to add a new block (step S901), and checks whether or not the end of the blockchain is frozen (step S902). If the end of the blockchain is not frozen (NO in step S902), the center server 10 goes to step S905. If the end of the blockchain is frozen (YES in step S902), the center server 10 follows the blockchain and searches for an unfrozen block (step S903). When finding an unfrozen block, the center server 10 couples a new block to the unfrozen block to cause the blockchain to branch (step S904). Then, the center server 10 generates an encryption key containing the partial data received from the colony server 20 (step S905), stores the encryption key, and generates a blockchain (step S906). Finally, the center server 10 provides notification of a hash value of the generated block to the colony server 20 as in the registration of data to be managed in FIG. 7 (step S907).

INDUSTRIAL APPLICABILITY

The data management system and the like according to the present invention are applicable to electronic commerce to safely store data to be managed such as cryptocurrency, virtual currency, electronic currency, or valuable securities through a network such as the Internet in a plurality of servers forming a cloud, and allow an information processing terminal used by a user to obtain the data to be managed as appropriate in response to a request from the terminal.

REFERENCE SIGNS LIST 10 center server
11 CPU
12 memory
13 bus
14 input/output interface
15 input unit
16 output unit
17 storage unit
18 communication unit
20 colony server
20A colony server
20B colony server
21 CPU
22 memory
23 bus
24 input/output interface
25 input unit
26 output unit
27 storage unit
28 communication unit
30 information processing terminal
30X information processing terminal
30Y information processing terminal
100 blockchain
101A block
101B block
101C block
102A hash value
102B hash value
102C hash value
103A nonce
103B nonce
104A hash value
104B hash value
105 encryption key
105A encryption key
111 partial data management unit
112 hash notification unit
113 encryption key obtaining unit
171 colony information storage unit
172 user information storage unit 173 encryption key storage unit
200 data block group
201A data block
204A hash value
205A body data
211 division transmission unit
212 body data management unit
213 hash update unit
271 hash information storage unit
272 body data storage unit
300 blockchain
N1 network
N2 network
X user
Y user

The invention claimed is:

1. A data management system comprising at least:
a terminal;
a colony server connected through a first network to the terminal; and
a center server connected through a second network to the colony server,
wherein the terminal transmits a request related to data to be managed to the colony server,
the colony server includes a processor configured to:
divide data to be managed, obtained, or generated in response to the request related to the data to be managed into partial data containing data of a predetermined size either from a beginning of the data to be managed or from any one part of the data to be managed, and body data containing a remaining part of the data to be managed, and transmit the partial data to the center server,
receive a hash value from the center server, and store the hash value associated with the body data, and update the hash value,
the center server includes a processor configured to:
generate an encryption key as encrypted data containing at least the partial data, and store, together with the encryption key, the hash value for identifying the encryption key,
transmit the hash value stored together with the encryption key to the colony server, and
identify the encryption key based on the hash value and obtain the encryption key,
the processor of the center server updates the hash value stored together with the encryption key to a new hash value that does not match the hash value stored associated with the body data at predetermined intervals, and transmits the new hash value to the colony server,
the processor of the colony server receives the new hash value, and updates the hash value stored associated with the body data to the new hash value,
when the hash value stored together with the encryption key is updated at the center server, the processor of the center server identifies the encryption key based on the new hash value and obtains the encryption key in response to a request related to data to be managed containing the new hash value from the colony server,
the partial data is recovered from the encryption key, and
the data to be managed is recovered by the terminal coupling the partial data and the body data.

2. The data management system according to claim 1, wherein the processor of the center server encrypts the partial data together with at least one of a filename and time of the data to be managed, and the encryption key contains the partial data and at least one of the filename and the time.

3. The data management system according to claim 1, wherein the request related to the data to be managed contains data to be managed corresponding to an object to be managed uploaded from the terminal.

4. The data management system according to claim 1, wherein the request related to the data to be managed is a request to cause the colony server to generate data to be managed corresponding to the object to be managed.

5. The data management system according to claim 1, wherein the predetermined size is 30 bytes or less from the beginning of the data to be managed.

6. The data management system according to claim 1, wherein the predetermined interval is 24 hours or shorter.

7. The data management system according to claim 1, wherein the first network is the Internet and the second network is a closed network.

8. The data management system according to claim 1, wherein the processor of the colony server divides the data to be managed to obtain the partial data from the any one part of the data to be managed.

9. A data management method performed by a data management system including at least a terminal, a colony server connected through a first network to the terminal, and a center server connected through a second network to the colony server, comprising the steps of:
the terminal transmitting a request related to data to be managed to the colony server;
the colony server dividing data to be managed, obtained, or generated in response to the request related to the data to be managed into partial data containing data of a predetermined size from a beginning of the data to be managed or from any one part of the data to be managed, and body data containing a remaining part of the data to be managed, and transmitting the partial data to the center server;
the center server generating an encryption key as encrypted data containing at least the partial data;
the center server storing, together with the encryption key, a hash value for identifying the encryption key;
the center server transmitting the hash value to the colony server; and
the colony server storing the hash value associated with the body data,
wherein the center server updates the hash value stored together with the encryption key to a new hash value that does not match the hash value stored associated with the body data at predetermined intervals, and transmits the new hash value to the colony server,
the colony server updates the hash value stored associated with the body data to the new hash value,
when the hash value stored together with the encryption key is updated at the center server, the center server identifies the encryption key based on the new hash value and obtains the encryption key in response to a request related to data to be managed containing the new hash value from the colony server, the partial data is recovered from the encryption key, and
the data to be managed is recovered by the terminal coupling the partial data and the body data.

10. The data management method according to claim 9, wherein in the step of generating the encryption key, the center server encrypts the partial data together with at least one of a filename and time of the data to be managed, and the encryption key contains the partial data and at least one of the filename and the time.

11. The data management method according to claim 9, wherein the request related to the data to be managed contains data to be managed corresponding to an object to be managed uploaded from the terminal.

12. The data management method according to claim 9, wherein the request related to the data to be managed is a request to cause the colony server to generate data to be managed corresponding to the object to be managed.

13. The data management method according to claim 9, wherein the predetermined size is 30 bytes or less from the beginning of the data to be managed.

14. The data management method according to claim 9, wherein the predetermined interval is 24 hours or shorter.

15. The data management method according to claim 9, wherein the first network is the Internet and the second network is a closed network.

16. The data management method according to claim 9, wherein the step of the colony server dividing data to be managed, obtained, or generated in response to the request related to the data to be managed includes dividing the data to be managed to obtain the partial data from the any one part of the data to be managed.

17. A colony server device comprising:
a processor configured to:
receive, from a terminal, a request related to data to be managed;
divide data to be managed, obtained, or generated in response to the request related to the data to be managed into partial data containing data of a predetermined size from a beginning of the data to be managed or from any one part of the data to be managed, and body data containing a remaining part of the data to be managed and transmit the partial data to a center server device; and
receive, from the center server device, a hash value for identifying an encryption key as encrypted data containing at least the partial data, and store the hash value associated with the body data,
wherein the colony server device receives, from the center server device, a new hash value that does not match the hash value stored associated with the body data at predetermined intervals,
the colony server device updates the hash value stored associated with the body data to the new hash value at predetermined intervals,
when the hash value stored together with the encryption key is updated, the colony server device transmits, to the center server device, a transaction request related to data to be managed containing the new hash value to cause the center server device to identify the encryption key based on the new hash value,
the partial data is recovered from the encryption key, and
the data to be managed is recovered by the terminal coupling the partial data and the body data.

18. The colony server device according to claim 17, wherein the processor divides the data to be managed to obtain the partial data from the any one part of the data to be managed.

19. A center server device comprising:
a processor configured to:
receive, from a colony server device, partial data containing data of a predetermined size either from a beginning of data to be managed or from any one part of the data to be managed;
generate an encryption key as encrypted data containing at least the partial data, and store, together with the encryption key, a hash value for identifying the encryption key; and
transmit the hash value stored together with the encryption key to the colony server device,
wherein the processor is configured to update the hash value stored together with the encryption key to a new hash value that does not match the hash value at predetermined intervals, and transmits the new hash value to the colony server device,
when the hash value stored together with the encryption key is updated, the center server device identifies the encryption key based on the new hash value in response to a request related to data to be managed containing the new hash value from the colony server device,
the partial data is recovered from the encryption key, and
the data to be managed is recovered by a terminal coupling the partial data and body data containing a remaining part of the data to be managed.

20. The center server device according to claim 19, wherein the partial data is obtained from the any one part of the data to be managed.

* * * * *